(12) United States Patent
Uchikawa et al.

(10) Patent No.: US 10,634,690 B2
(45) Date of Patent: Apr. 28, 2020

(54) AUTOMATIC ANALYZING APPARATUS

(71) Applicant: TOSHIBA MEDICAL SYSTEMS CORPORATION, Otawara-shi (JP)

(72) Inventors: Asuka Uchikawa, Nasushiobara (JP); Shoichi Kanayama, Otawara (JP)

(73) Assignee: Canon Medical Systems Corporation, Otawara-shi (JP)

( * ) Notice: Subject to any disclaimer, the term of this patent is extended or adjusted under 35 U.S.C. 154(b) by 0 days.

(21) Appl. No.: 14/858,761

(22) Filed: Sep. 18, 2015

(65) Prior Publication Data

US 2016/0011222 A1 Jan. 14, 2016

Related U.S. Application Data

(63) Continuation of application No. PCT/JP2014/057333, filed on Mar. 18, 2014.

(30) Foreign Application Priority Data

Mar. 18, 2013 (JP) .................................. 2013-055508

(51) Int. Cl.
*G01N 35/00* (2006.01)
*G01N 35/10* (2006.01)
(Continued)

(52) U.S. Cl.
CPC ... *G01N 35/00584* (2013.01); *G01N 35/1002* (2013.01); *G01N 21/253* (2013.01);
(Continued)

(58) Field of Classification Search
CPC ............................................. G01N 2035/0437
See application file for complete search history.

(56) References Cited

U.S. PATENT DOCUMENTS 5,434,083 A 7/1995 Mitsumaki et al.
5,679,309 A * 10/1997 Bell ..................... G01N 35/025
422/547

FOREIGN PATENT DOCUMENTS

JP 60-60558 A 4/1985
JP 3-48161 A 3/1991
(Continued)

OTHER PUBLICATIONS

Machine-generated English translation of JP 07-289286 to Hitachi LTD, publisedh Nov. 7, 1995.*
(Continued)

*Primary Examiner* — Kathryn Wright
(74) *Attorney, Agent, or Firm* — Oblon, McClelland, Maier & Neustadt, L.L.P.

(57) ABSTRACT

According to one embodiment, there is provided an automatic analyzing apparatus which comprises determination processing circuitry, an analyzer mechanism and data processing circuitry. The determination processing circuitry determines whether to continue reaction of a solution mixture based on reaction data. The analyzer mechanism generates analytical data based on test data generated by measuring the solution mixture. The data processing circuitry performs control such that the analytical data is generated in a first measurement section if it is determined that continuation of the reaction of the solution mixture is unnecessary, and the analytical data is generated by measuring the solution mixture after the first measurement section if it is determined that continuation of the reaction of the solution mixture is necessary.

8 Claims, 11 Drawing Sheets

(51) Int. Cl.
  *G01N 21/25* (2006.01)
  *G01N 21/78* (2006.01)
  *G01N 21/82* (2006.01)
  *G01N 35/04* (2006.01)

(52) U.S. Cl.
  CPC ............ *G01N 21/78* (2013.01); *G01N 21/82* (2013.01); *G01N 2035/0094* (2013.01); *G01N 2035/0097* (2013.01); *G01N 2035/0437* (2013.01)

(56) References Cited

FOREIGN PATENT DOCUMENTS

| | | | |
|---|---|---|---|
| JP | 6-160398 | A | 6/1994 |
| JP | 07-120381 | A | 5/1995 |
| JP | 7-289286 | A | 11/1995 |
| JP | 2539512 | B2 | 7/1996 |
| JP | 2000-221198 | A | 8/2000 |
| JP | 4423463 | B2 | 3/2010 |
| JP | 2014-70901 | A | 4/2014 |

OTHER PUBLICATIONS

International Search Report dated May 27, 2014 for PCT/JP2014/057333 filed on Mar. 18, 2014 with English Translation.

\* cited by examiner

Analytical parameter setting screen

Item: A  
Round: 2  
Reaction time: T3

Sample parameters
Discharge amount(μL): 5     Discharge round: 1

Determination parameters
Execute: ☑     Determination amount round: 1     Criteria: A>1.5、ΔA>0.2

Reagent parameters

| | | | | |
|---|---|---|---|---|
| Reagent: | R1 | R2 | R3 | |
| Reagent name: | A1 | A2 | A3 | |
| Discharge amount(μL): | 100 | 50 | 20 | |
| Discharge position: | Pb | Pd | Pb | |
| Discharge round: | 1 | 1 | 2 | |

Observation parameters

| | 1 | 2 |
|---|---|---|
| Main observation section: | 31-33 | 55-57 |
| Sub observation section: | 14-16 | 40-45 |
| Determination observation section: | 30-33 | |

Stirring parameters

| | | | |
|---|---|---|---|
| Stirring position: | Pc | Pe | Pc |
| Stirring round: | 1 | 1 | 2 |

Reaction sequence

Analytical parameter setting screen

Item: B

Round: 2
Reaction time: T3

Sample parameters
Discharge amount(μL): 5    Discharge round: 1

Determination parameters
Execute: [✓]    Determination amount round: 1    Criteria: ΔA<0.01, A<0.15

Reagent parameters

| Reagent: | R1 | R2 |
|---|---|---|
| Reagent name: | B1 | B2 |
| Discharge amount(μL): | 80 | 50 |
| Discharge position: | Pb | Pd |
| Discharge round: | 1 | 1 |

Observation parameters

|  | 1 | 2 |
|---|---|---|
| Main observation section: | 21-33 | 21-57 |
| Sub observation section: | 10-16 | 10-16 |
| Determination observation section: | 30-33 |  |

Stirring parameters

| Stirring position: | Pc | Pe |
|---|---|---|
| Stirring round: | 1 | 1 |

Reaction sequence

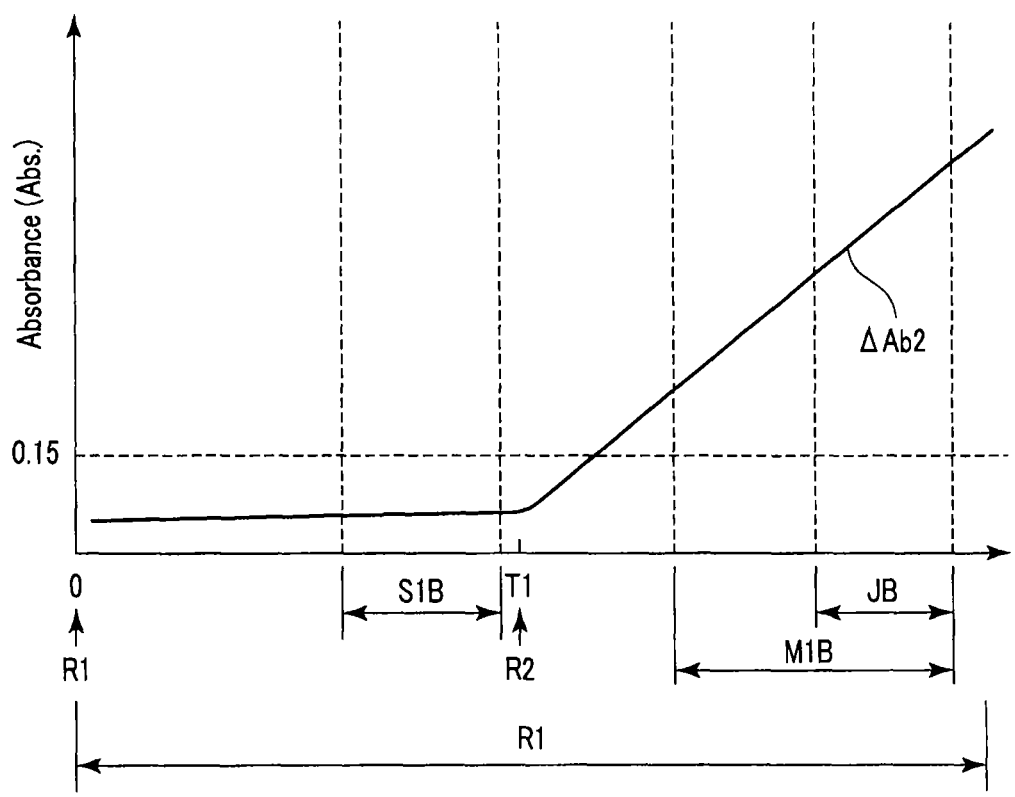
F I G. 10

AUTOMATIC ANALYZING APPARATUS

This application is a Continuation application of PCT Application No. PCT/JP2014/057333, filed Mar. 18, 2014 and based upon and claims the benefit of priority from the Japanese Patent Application No. 2013-055508, filed Mar. 18, 2013, the entire contents of all of which are incorporated herein by reference.

FIELD

Embodiments described herein relate generally to an automatic analyzing apparatus for analyzing a component contained in a liquid such as a sample extracted from an object.

BACKGROUND

An automatic analyzing apparatus is used to analyze biological test items and immunological test items, and optically measures a change in color or turbidity caused by the reaction of a solution mixture of a test sample extracted from an object and a reagent to be used to analyze each test item. By this measurement, the automatic analyzing apparatus generates analytical data represented by, e.g., the concentrations of various test item components in the test sample and the activity of an enzyme.

The automatic analyzing apparatus includes analytical units such as a reaction vessel, sample dispensing probe, reagent dispensing probe, measurement unit, and cleaning nozzle. The reaction vessel moves and stops for each predetermined cycle time. The sample dispensing probe sucks a sample from a sample vessel and discharges the sample into the reaction vessel for each test item. The reagent dispensing probe sucks a reagent for analyzing each test item from a reagent vessel and discharges the reagent into the reaction vessel. The measurement unit measures a solution mixture of the sample and reagent discharged into the reaction vessel. The cleaning nozzle cleans the interior of the reaction vessel containing the solution mixture after the measurement.

There is an automatic analyzing apparatus having an automatic retesting function which, if analytical data has a high value falling outside a preset range, for example, can prepare a diluted sample by diluting a test sample showing the high value, and remeasure a solution mixture of the diluted sample and a reagent.

Unfortunately, it is necessary to perform remeasurement by preparing a diluted sample by diluting a test sample. This is a large load on an operator who operates the automatic analyzing apparatus required to rapidly perform tests.

An embodiment has been made to solve the above-mentioned problem, and has as its object to provide an automatic analyzing apparatus capable of rapidly performing tests by reducing the load on an operator.

BRIEF DESCRIPTION OF THE DRAWINGS

FIG. 5 is a view showing an example of a test item analytical parameter setting screen displayed on a display unit according to the embodiment.

FIG. 8 is a view showing an example of the test item analytical parameter setting screen displayed on the display unit according to the embodiment.

FIG. 10 is a view showing an example when it is determined that the continuation of a reaction is unnecessary according to the embodiment.

DETAILED DESCRIPTION

According to one embodiment, there is provided an automatic analyzing apparatus which comprises determination processing circuitry, an analyzer mechanism and data processing circuitry. The determination processing circuitry determines whether to continue reaction of a solution mixture based on reaction data. The analyzer mechanism generates analytical data based on test data generated by measuring the solution mixture. The data processing circuitry performs control such that the analytical data is generated in a first measurement section if it is determined that continuation of the reaction of the solution mixture is unnecessary, and the analytical data is generated by measuring the solution mixture after the first measurement section if it is determined that continuation of the reaction of the solution mixture is necessary.

Embodiments will be explained below with reference to the accompanying drawings.

Figure 1:
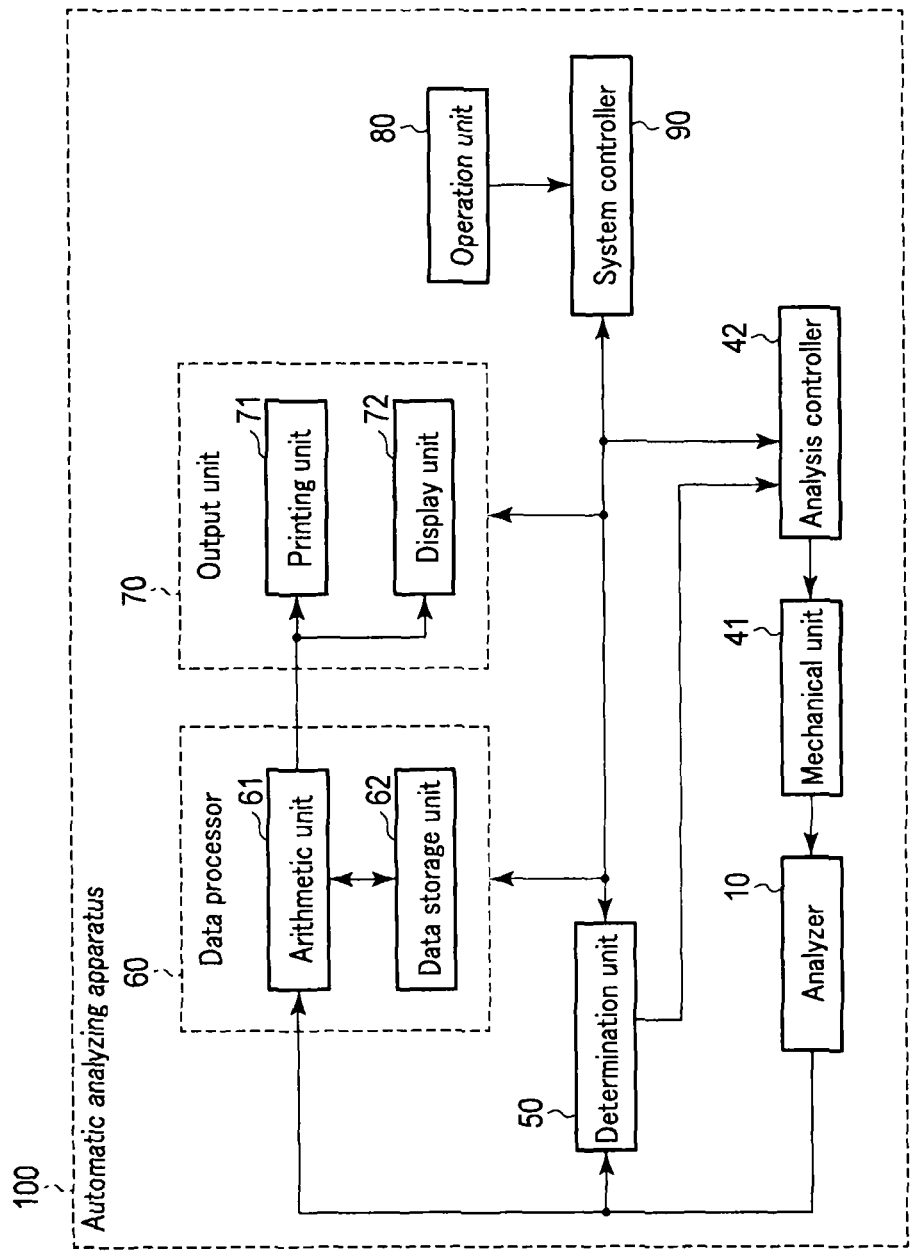
FIG. 1 is a block diagram showing the arrangement of an automatic analyzing apparatus according to an embodiment.

FIG. 1 is a block diagram showing the arrangement of an automatic analyzing apparatus according to an embodiment. An automatic analyzing apparatus 100 includes an analyzer 10 which generates standard data, reaction data, and test data by measuring a solution mixture of a standard sample for analyzing each test item and a reagent, and a solution mixture of a test sample and a reagent for analyzing each test item, a mechanical unit 41 which drives each analytical unit pertaining to the measurement by the analyzer 10, an analysis controller 42 for controlling the mechanical unit 41, and a determination unit 50 which includes processing circuitry and a memory and determines whether to continue the reaction of the solution mixture of the test sample and reagent based on reaction data generated by the measurement by the analyzer 10.

The automatic analyzing apparatus 100 also includes a data processor 60 which includes processing circuitry and a memory and generates calibration data and analytical data based on the standard data and test data generated by the measurement by the analyzer 10, and an output unit 70 which prints out and displays the calibration data and analytical data generated by the data processor 60. The automatic analyzing apparatus 100 further includes an operation unit 80 which performs, e.g., an input operation for setting analytical parameters of each test item, and a system controller 90 for controlling the analysis controller 42, determination unit 50, data processor 60, and output unit 70.

Figure 2:
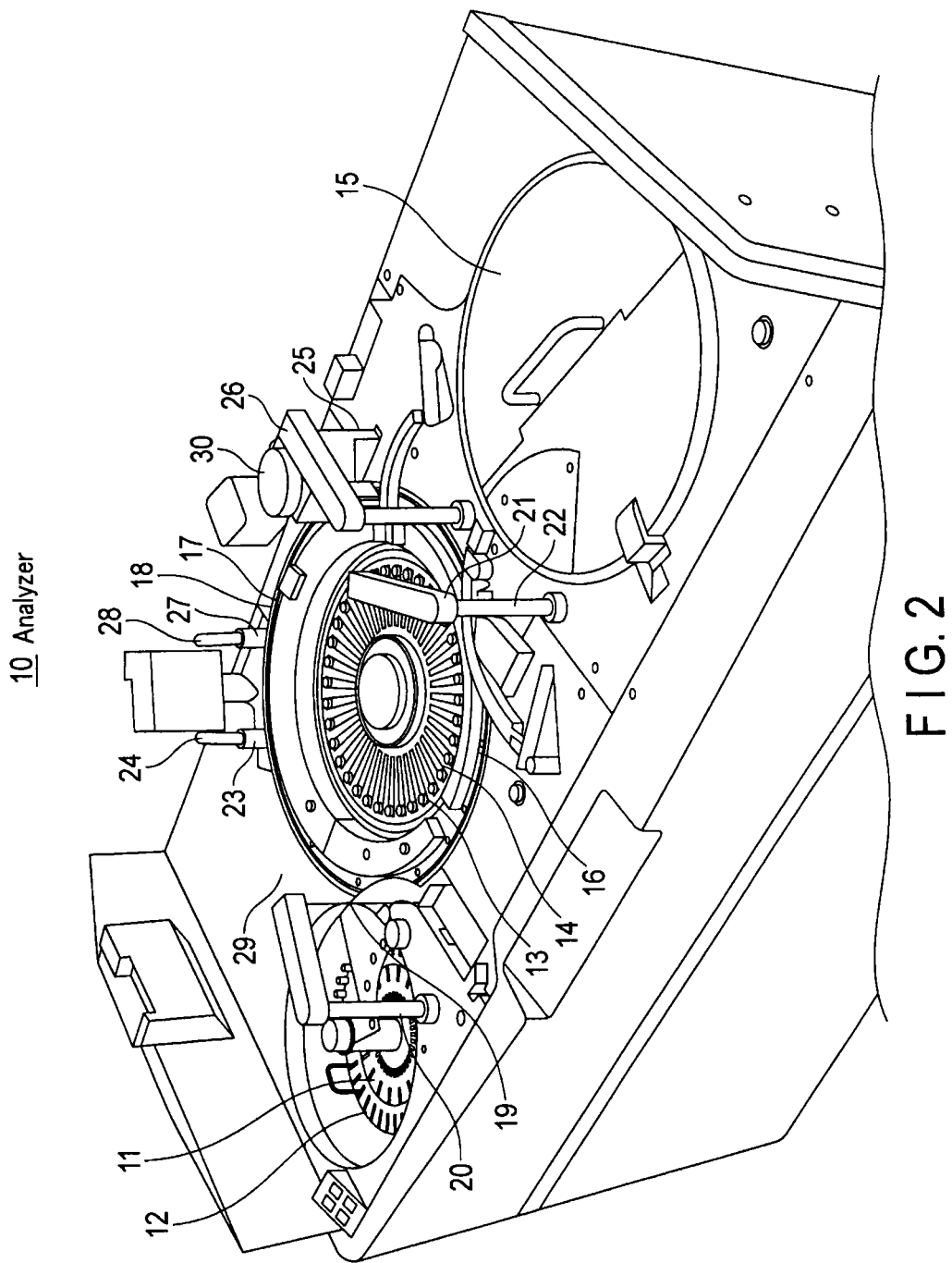
FIG. 2 is a perspective view showing the arrangement of an analyzer according to the embodiment.

FIG. 2 is a perspective view showing the arrangement of the analyzer 10. The analyzer 10 includes a sample vessel 11 for containing each sample such as a standard sample or test sample for analyzing each test item, and a sample table 12 which movably holds the sample vessel 11. The analyzer 10 also includes a reagent vessel 13 for containing a reagent for analyzing each test item, two reagent closets 15 and 16 for cooling the reagent in the reagent vessel 13, and two reagent racks 14 arranged in the reagent closets 15 and 16 for movably holding the reagent vessel 13. The analyzer 10 further includes a reaction table 18 which holds, e.g., 165 reaction vessels 17 arranged in a line at equal intervals on the circumference, such that the reaction vessels 17 can rotate in one direction.

In addition, the analyzer 10 includes a sample dispensing probe 19 which performs dispensing, i.e., sucks a sample in the sample vessel 11 held on the sample table 12 and discharges the sample into the reaction vessel 17 stopped in a sample discharge position, and a sample dispensing arm 20 for holding the sample dispensing probe 19 so that the sample dispensing probe 19 is rotationally movable and vertically movable. Also, the analyzer 10 includes a first reagent dispensing probe 21 which performs dispensing, i.e., sucks a reagent in the reagent vessel 13 held on the reagent rack 14 in the reagent closet 15 and discharges the reagent into the reaction vessel 17 stopped in a first reagent discharge position, and a first reagent dispensing arm 22 for holding the first reagent dispensing probe 21 so that the first reagent dispensing probe 21 is rotationally movable and vertically movable.

Furthermore, the analyzer 10 includes a first stirrer 23 for stirring a solution mixture of a sample and reagent in the reaction vessel 17 stopped in a first stirring position after the reagent is discharged by the first reagent dispensing probe 21, and a first stirring arm 24 for holding the first stirrer 23 such that the first stirrer 23 is rotationally movable and vertically movable. The analyzer 10 also includes a second reagent dispensing probe 25 which performs dispensing, i.e., sucks a reagent in the reagent vessel 13 held on the reagent rack 14 in the reagent closet 16 and discharges the reagent into the reaction vessel 17 stopped in a second reagent discharge position, and a first reagent dispensing arm 26 for holding the second reagent dispensing probe 25 so that the second reagent dispensing probe 25 is rotationally movable and vertically movable.

The analyzer 10 additionally includes a second stirrer 27 for stirring a solution mixture of a sample and reagent in the reaction vessel 17 stopped in a second stirring position after the reagent is discharged by the second reagent dispensing probe 25, a second stirring arm 28 for holding the second stirrer 27 such that the second stirrer 27 is rotationally movable and vertically movable, a measurement unit 29 for optically measuring a solution mixture by irradiating the reaction vessel 17 in a measurement position with light, and a cleaning nozzle 30 for cleaning the interior of the reaction vessel 17 having undergone the measurement by the measurement unit 29 and stopped in a cleaning position.

The measurement unit 29 irradiates each rotationally moving reaction vessel 17 in the measurement position with light, and detects light transmitted through a solution mixture in the reaction vessel 17, thereby generating each data which indicates, by absorbance, the state of a direct or indirect reaction between a test item component contained in the solution mixture and a matrix contained in the reagent. Then, the measurement unit 29 generates standard data by measuring a solution mixture of a standard sample and the reagent, and outputs the data to the data processor 60. Also, the measurement unit 29 generates reaction data by measuring a solution mixture of a test sample and the reagent, and outputs the data to the determination unit 50. Furthermore, the measurement unit 29 generates test data by measuring the solution mixture of the test sample and reagent, and outputs the data to the data processor 60.

The mechanical unit 41 shown in FIG. 1 includes a mechanism for driving each analytical unit of the analyzer 10. The mechanical unit 41 moves the sample vessel 11 by driving the sample table 12. The mechanical unit 40 rotationally moves the reagent vessel 13 by driving each reagent rack 14. The mechanical unit 41 rotationally moves the reaction vessel 17 by driving the reaction table 18. The mechanical unit 41 rotationally and vertically moves the sample dispensing probe 19, first reagent dispensing probe 21, first stirrer 23, second reagent dispensing probe 25, and second stirrer 27 by rotationally and vertically moving the sample dispensing arm 20, first reagent dispensing arm 22, first stirring arm 24, second reagent dispensing arm 26, and second stirring arm 28, respectively. The mechanical unit 41 vertically moves the cleaning nozzle 30.

Also, the mechanical unit 41 drives each pump. The mechanical unit 41 causes the sample dispensing probe 19 to suck and discharge a sample. The mechanical unit 41 causes the first reagent dispensing probe 21 to suck and discharge a reagent. The mechanical unit 41 drives the first stirrer 23 to stir a solution mixture in the reaction vessel 17. The mechanical unit 41 causes the second reagent dispensing probe 25 to suck and discharge a reagent. The mechanical unit 41 drives the second stirrer 27 to stir a solution mixture in the reaction vessel 17. The mechanical unit 41 causes the cleaning nozzle 30 to suck a solution mixture in the reaction vessel 17, and discharge and suck a cleaning solution for cleaning the interior of the reaction vessel 17.

The analysis controller 42 includes processing circuitry and a memory. The analysis controller 42 controls, e.g., each mechanism of the mechanical unit 41 and the measurement unit 29 of the analyzer 10 based on, e.g., the analytical parameters of each test item and the determination results of the determination unit 50. The determination unit 50 performs determination, and causes the cleaning nozzle 30 to clean the reaction vessel 17 containing a solution mixture of a standard sample or test sample and a reagent, when the reaction vessel 17 stops at the cleaning position for the first time after the reaction vessel 17 is cleaned by the cleaning nozzle 30.

If the determination unit 50 determines that it is unnecessary to continue the reaction of a solution mixture of a test sample and reagent, the analysis controller 42 causes the cleaning nozzle 30 to clean the reaction vessel 17 containing the solution mixture when the reaction vessel 17 stops at the cleaning position for the first time after the reaction vessel 17 is cleaned by the cleaning nozzle 30, or causes the cleaning nozzle 30 to stop cleaning the reaction vessel 17 until the reaction vessel 17 stops at the cleaning position for the nth time (n is an integer of 2 or more). Also, if the determination unit 50 determines that it is necessary to continue the reaction between the test sample and reagent, the analysis controller 42 causes the cleaning nozzle 30 to stop cleaning the reaction vessel 17 containing the solution mixture until the reaction vessel 17 stops at the cleaning position for the mth time (m is an integer of n or more) after the reaction vessel 17 is cleaned by the cleaning nozzle 30.

The determination unit 50 determines whether to continue the reaction of a solution mixture of a test sample and reagent based on reaction data generated by measuring the solution mixture by the measurement unit 29 of the analyzer 10. Then, the determination unit 50 outputs the determination result to the analysis controller 42.

The data processor 60 includes an arithmetic unit 61 for generating calibration data and analytical data of each test item based on standard data and test data output from the measurement unit 29 of the analyzer 10, and a data storage unit 62 for storing standard data and analytical data generated by the arithmetic unit 61.

The arithmetic unit 61 generates calibration data indicating the relationship between standard data output from the measurement unit 29 and a standard value preset for a standard sample of the standard data, outputs the generated calibration data to the output unit 70, and stores the calibration data in the data storage unit 62.

Furthermore, the arithmetic unit 61 reads out, from the data storage unit 62, calibration data of a test item corresponding to test data output from the measurement unit 29, and generates analytical data represented by a concentration value or an activity value of an enzyme from the readout calibration data and test data. Then, the arithmetic unit 61 outputs the generated analytical data to the output unit 70, and stores the data in the data storage unit 62.

The data storage unit 62 includes a memory device such as a hard disk, and stores calibration data output from the arithmetic unit 61 for each test item. The data storage unit 62 also stores analytical data of each test item output from the arithmetic unit 61 for each test sample.

The output unit 70 includes a printing unit 71 for printing out calibration data and analytical data output from the arithmetic unit 61 of the data processor 60, and a display unit 72 for displaying the data. The printing unit 71 includes a printer and the like, and prints out calibration data and analytical data output from the arithmetic unit 61 onto a printer sheet in accordance with a preset format.

The display unit 72 includes a monitor such as a CRT or liquid crystal panel, and displays calibration data and analytical data output from the arithmetic unit 61. Also, the display unit 72 displays an analytical parameter setting screen for setting, for each test item, analytical parameters such as the number of rounds, a determination section as a determination timing for generating reaction data, and a measurement section as a measurement timing for generating standard data and test data. Furthermore, the display unit 72 displays, e.g., a test item setting screen for setting, for each test sample, object identification information such as a name or ID for identifying the test sample, and test items necessary for the test.

The operation unit 80 includes input devices such as a keyboard, a mouse, buttons, and a touch key panel. The operation unit 80 performs an input operation for setting the analytical parameters such as the number of rounds, the determination section, and the measurement section for each test item. The operation unit 80 also performs an input operation for setting the object identification information and test items of a test sample.

The system controller 90 includes a CPU and storage circuit, and stores, in the storage circuit, information input by an operation from the operation unit 80, such as a command signal, information of the analytical parameters of each test item, object identification information, and test item information. After that, based on these pieces of input information, the system controller 90 controls the whole system by integrating the analysis controller 42, determination unit 50, data processor 60, and output unit 70.

Examples of operations of the analyzer 10, determination unit 50, and data processor 60 will now be explained with reference to FIGS. 1, 2, 3, and 4.

First, outlines of operations of the reaction table 18, reaction vessel 17, and measurement unit 29 of the analyzer 10 will be explained.

Figure 3:
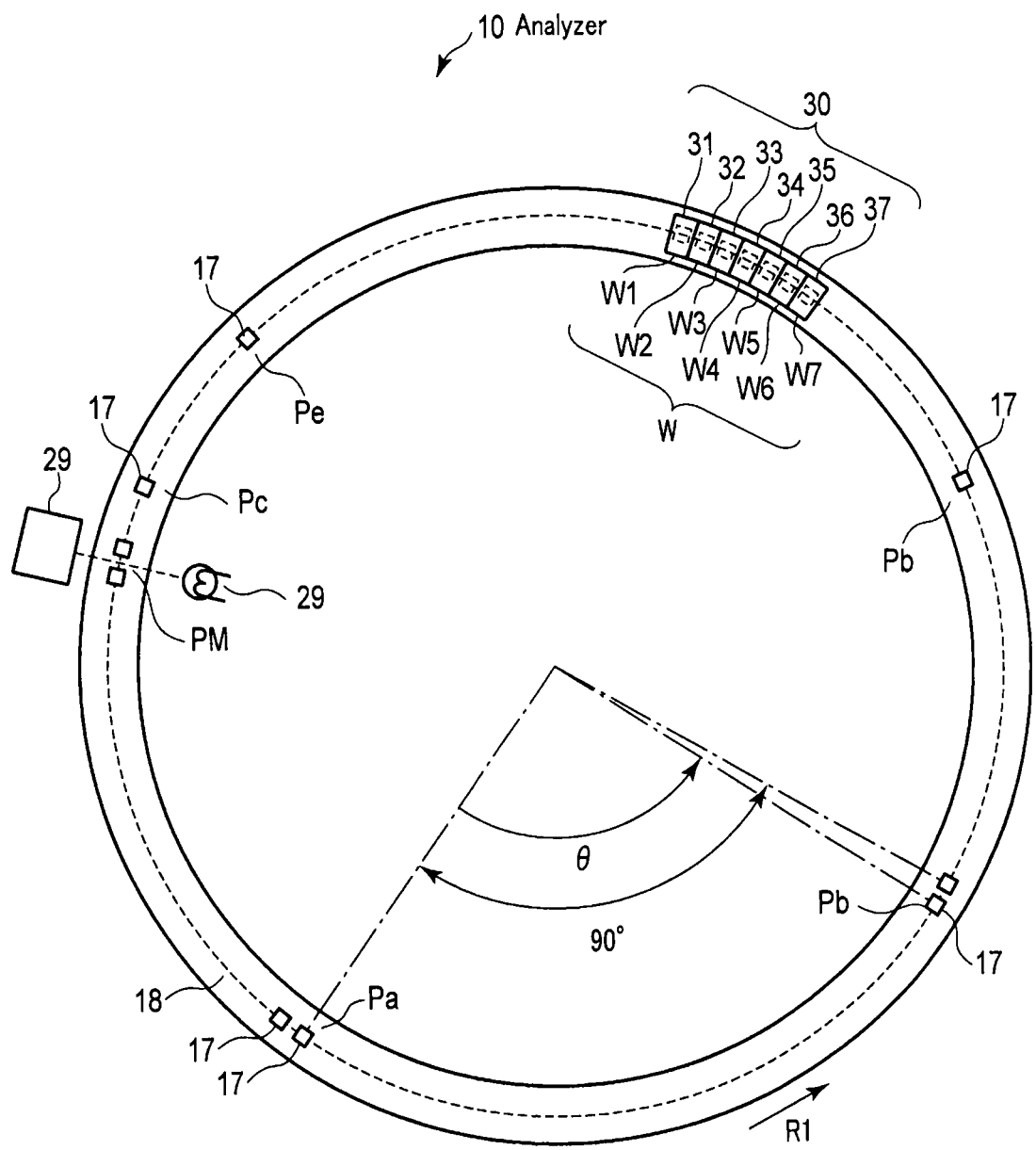
FIG. 3 is a view showing each stop position of each reaction vessel held on a reaction table of the analyzer and the position of a measurement unit according to the embodiment.

FIG. 3 is a view showing each stop position of each reaction vessel 17 held on the reaction table 18 of the analyzer 10 and the position of the measurement unit 29. The mechanical unit 41 rotationally drives the reaction table 18. Each reaction vessel 17 rotationally moves in one direction for each cycle time, and stops at stop positions including a cleaning position W, sample discharge position Pa, first reagent discharge position Pb, first stirring position Pc, second reagent discharge position Pd, and second stirring position Pe, all of which are different from those before the movement. Then, the reaction vessel 17 stops at the same stop position for each round time longer than one cycle time.

A period from the timing at which the cleaning nozzle 30 cleans the reaction vessel 17 in the cleaning position W to the timing at which the cleaning vessel 17 stops at the cleaning position W for the first time after one round time is the first round. Also, a period until the reaction vessel 17 in the cleaning position W, for which cleaning is stopped in the first round, stops at the cleaning position W for the second time after the first round time is the second round. Furthermore, a period until the reaction vessel 17 in the cleaning position W, for which cleaning is stopped in the second round, stops at the cleaning position W for the third time after one round time is the third round.

In the following description, an example of a case in which each reaction vessel 17 rotationally moves in the direction of an arrow R1 for each cycle time by rotational driving at an angle θ of the reaction table 18 and stops at the position of an adjacent reaction vessel 17 in the direction opposite to the direction R1 with respect to the reaction vessel 17 positioned at an angle of, e.g., 90° in the direction R1 from the position before the movement will be explained.

The measurement unit 29 is installed across the inner and outer circumferences of each reaction vessel 17. Whenever the reaction table 18 rotates, each reaction vessel 17 rotationally moving through a measurement position PM is irradiated with light, and light transmitted through a solution mixture in the reaction vessel 17 is detected. Then, standard data, reaction data, and test data are generated by measurement at the timing at which the reaction vessel 17 passes through the measurement position PM.

Next, the arrangement and operation of the cleaning nozzle 30 will be explained.

Figure 4:
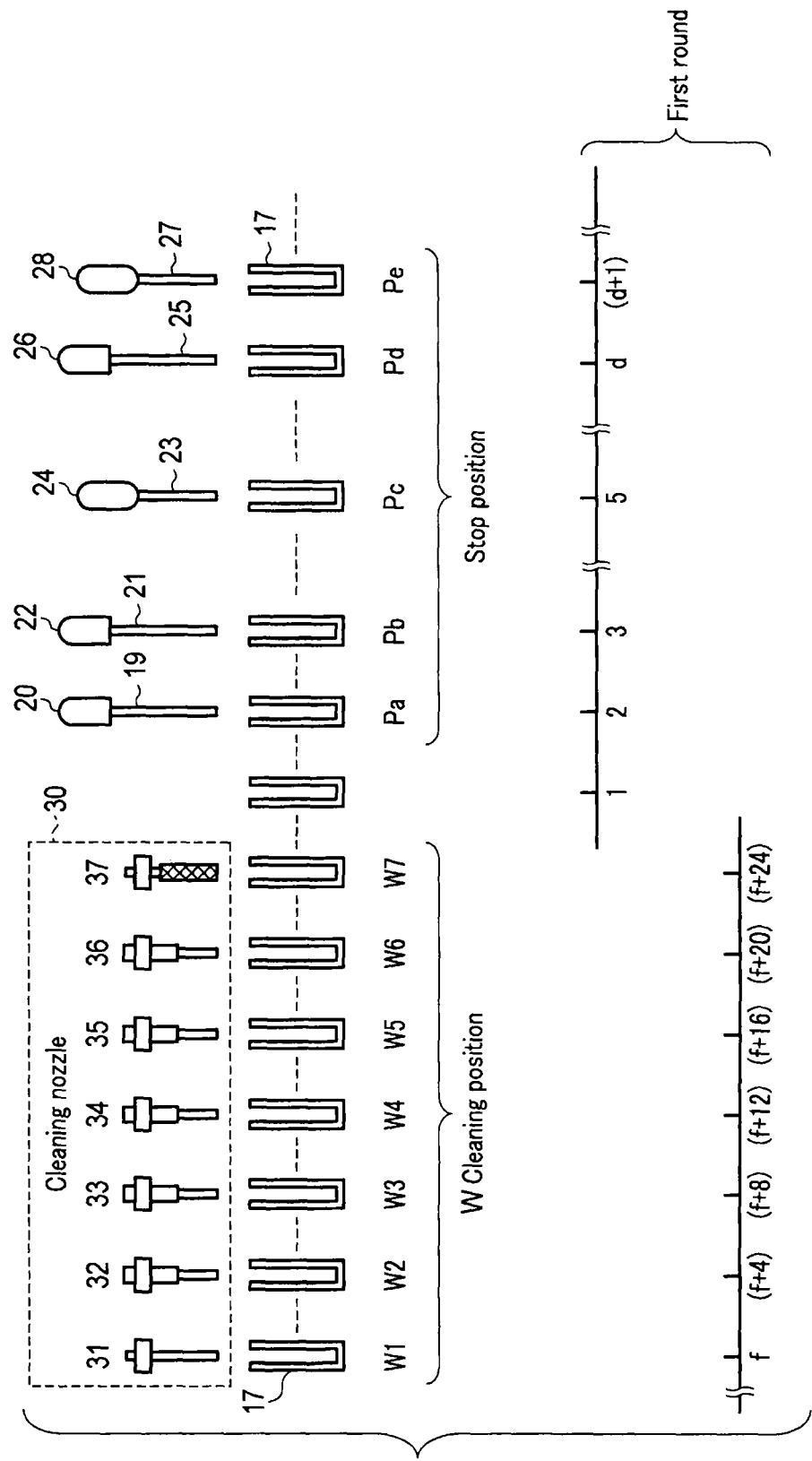
FIG. 4 is a view showing the arrangement of a cleaning nozzle and each stop position of each reaction vessel according to the embodiment.

FIG. 4 is a view showing the arrangement of the cleaning nozzle 30 and each stop position of each reaction vessel 17. The cleaning nozzle 30 includes, e.g., first to seventh cleaning nozzles 31 to 37. The first to seventh cleaning nozzles 31 to 37 are so arranged as to be independently vertically movable in first to seventh cleaning positions W1 to W7 of the cleaning position W by vertical driving by the mechanical unit 41.

The first to seventh cleaning nozzles 31 to 37 are stopped in upper stop positions above the reaction table 18 while the reaction table 18 is rotating. When the reaction table 18 stops and the reaction vessels 17 as cleaning targets stop at the first to seventh cleaning positions W1 to W7, the first to seventh cleaning nozzles 31 to 37 move down to enter the reaction vessels 17, stop at lower stop positions where the lower ends come close to the inner bottom surfaces of the reaction vessels 17, and perform cleaning. After cleaning is complete, the first to seventh nozzles 31 to 37 move up and stop at the upper stop positions.

When the reaction vessel 17 containing a solution mixture for which it is determined by the determination unit 50 that the reaction need not be continued is stopped in the first cleaning position W1, or when the reaction vessel 17 having reached the number of rounds set as an analytical parameter is stopped in the first cleaning position W1, the first cleaning nozzle 31 moves down and stops at the lower stop position. Then, the first cleaning nozzle 31 performs cleaning by sucking the solution mixture in the reaction vessel 17. Also, when the reaction vessel 17 containing a solution mixture for which it is determined by the determination unit 50 that the reaction needs to be continued is stopped in the first cleaning position W1, or when the reaction vessel 17 not having reached the number of rounds set as an analytical parameter is stopped in the first cleaning position W1, the first cleaning nozzle 31 stops at the upper stop position and stops cleaning.

When the reaction vessel 17 cleaned in the first cleaning position W1 is stopped in the second cleaning position W2, the second cleaning nozzle 32 moves down and stops at the lower stop position. Then, the second cleaning nozzle 32 performs cleaning by discharging a first cleaning solution such as an alkaline cleaning solution for washing away the solution mixture remaining in the reaction vessel 17, and sucking the discharged first cleaning solution. Also, when the reaction vessel 17 for which cleaning is stopped in the first cleaning position W1 is stopped in the second cleaning position W2, the second cleaning nozzle 32 stops at the upper stop position and stops cleaning.

When the reaction vessel 17 cleaned in the second cleaning position W2 is stopped in the third cleaning position W3, the third cleaning nozzle 33 moves down and stops at the lower stop position. Then, the third cleaning nozzle 33 performs cleaning by discharging a second cleaning solution such as an acidic cleaning solution for washing away the solution mixture in the reaction vessel 17, which cannot be washed away with the first cleaning solution, and sucking the discharged second cleaning solution. Also, when the reaction vessel 17 for which cleaning is stopped in the second cleaning position W2 is stopped in the third cleaning position W3, the third cleaning nozzle 33 stops at the upper stop position and stops cleaning.

When the reaction vessel 17 cleaned in the third cleaning position W3 is stopped in the fourth cleaning position W4, the fourth cleaning nozzle 34 moves down and stops at the lower stop position. Then, the fourth cleaning nozzle 34 performs cleaning by discharging a cleaning solution such as cleaning water for washing away the second cleaning solution in the reaction vessel 17, and sucking the cleaning water. Also, when the reaction vessel 17 for which cleaning is stopped in the third cleaning position W3 is stopped in the fourth cleaning position W4, the fourth cleaning nozzle 34 stops at the upper stop position and stops cleaning.

When the reaction vessel 17 cleaned in the fourth cleaning position W4 is stopped in the fifth cleaning position W5, the fifth cleaning nozzle 35 moves down and stops at the lower stop position. Then, the fifth cleaning nozzle 35 performs cleaning by discharging cleaning water into the reaction vessel 17 and sucking the cleaning water. Also, when the reaction vessel 17 for which cleaning is stopped in the fourth cleaning position W4 is stopped in the fifth cleaning position W5, the fifth cleaning nozzle 35 stops at the upper stop position and stops cleaning.

When the reaction vessel 17 cleaned in the fifth cleaning position W5 is stopped in the sixth cleaning position W6, the sixth cleaning nozzle 36 moves down and stops at the lower stop position. Then, the sixth cleaning nozzle 36 performs cleaning by sucking the cleaning water remaining in the reaction vessel 17. Also, when the reaction vessel 17 for which cleaning is stopped in the fifth cleaning position W5 is stopped in the sixth cleaning position W6, the sixth cleaning nozzle 36 stops at the upper stop position and stops cleaning.

When the reaction vessel 17 cleaned in the sixth cleaning position W6 is stopped in the seventh cleaning position W7, the seventh cleaning nozzle 37 moves down and stops at the lower stop position. Then, the seventh cleaning nozzle 37 performs cleaning by further sucking the cleaning water remaining in the reaction vessel 17. Also, when the reaction vessel 17 for which cleaning is stopped in the sixth cleaning position W6 is stopped in the seventh cleaning position W7, the seventh cleaning nozzle 37 stops at the upper stop position and stops cleaning.

Next, each stop position where each reaction vessel 17 stops whenever the reaction table 18 rotates and examples of operations of dispensing and stirring a sample and reagent in each stop position will be explained.

The analysis controller 42 determines that the reaction vessel 17 cleaned by the seventh cleaning nozzle 37 of the cleaning nozzle 30 and stopped in the seventh cleaning position W7 of the cleaning position W while the seventh cleaning nozzle 37 is stopped in the upper stop position is to be used to analyze a test item set for each test sample.

Then, when p (a positive integer) is set as the number of rounds of an analytical parameter by an input operation from the operation unit 80 and the determination unit 50 performs no determination, the analysis controller 42 stops the reaction vessel 17 scheduled to be used for test item analysis p times in the sample discharge position. Pa, first reagent discharge position Pb, first stirring position Pc, second reagent discharge position Pd, and second stirring position Pe. Subsequently, the analysis controller 42 stops cleaning of the reaction vessel 17 scheduled to be used for test item analysis until the reaction vessel 17 stops at the cleaning position W for the pth time after a p round time. Also, when p is set as the number of rounds and the determination unit 50 performs determination, the analysis controller 42 stops cleaning until the reaction vessel 17 scheduled to be used for test item analysis stops at the cleaning position W for maximally the pth time, based on the analytical parameter of the test item and the determination result of the determination unit 50.

In the sample discharge position Pa, a sample can be discharged to the reaction vessel 17 for test item analysis at maximally p timings, and the sample can be discharged at at least one of the p timings. In the first reagent discharge position Pb, a reagent can be discharged to the reaction vessel 19 for test item analysis at maximally p timings, and the reagent can be discharged at at least one of the p timings. In the first stirring position Pc, a solution mixture in the reaction vessel 19 for test item analysis can be stirred at maximally p timings, and the solution mixture can be stirred at at least one of the p timings. In the second reagent discharge position Pd, the reagent can be discharged to the reaction vessel 19 for test item analysis at maximally p timings, and the reagent can be discharged at at least one of the p timings. In the second stirring position Pe, the solution mixture in the reaction vessel 19 for test item analysis can be stirred at maximally p timings, and the solution mixture can be stirred at at least one of the p timings.

In the first cycle of the first round, the reaction vessel 17 scheduled to be used for test item analysis after being cleaned in the cleaning position W rotationally moves from the seventh cleaning position W7 and stops by a rotation at the angle θ of the reaction table 18.

In the second cycle after the elapse of one cycle time from the first cycle, the reaction vessel 17 for test item analysis stops at the sample discharge position P1 for the first time since cleaning. If discharge of a sample is set at the timing of the first round, the sample dispensing probe 19 sucks the sample from the sample vessel 11 held on the sample table 12, and discharges the sample into the reaction vessel 17 in the sample discharge position Pa.

In the third cycle after the elapse of one cycle time from the second cycle, the reaction vessel 17 stopped at the sample discharge position Pa in the second cycle stops at the first reagent discharge position Pb for the first time since cleaning. If discharge of a reagent from the first reagent discharge position Pb is set at the timing of the first round, the first reagent dispensing probe 21 sucks the reagent from the reagent vessel 13 held on the reagent rack 14 in the reagent closet 15, and discharges the reagent into the reaction vessel 17 in the first reagent discharge position Pb.

In the fifth cycle after the elapse of two cycle times from the third cycle, the reaction vessel 17 stopped at the first reagent discharge position Pb in the third cycle stops at the first stirring position Pc for the first time since cleaning. If stirring of a solution mixture from the first stirring position Pc is set at the timing of the first round, the first stirrer 23 stirs the solution mixture of the sample and reagent in the reaction vessel 17 in the first stirring position Pc.

In the dth cycle after the elapse of a predetermined number of cycle times from the fifth cycle, the reaction vessel 17 stopped at the first stirring position Pc in the fifth cycle stops at the second reagent discharge position Pd for the first time since cleaning. If discharge of a reagent from the second reagent discharge position Pd is set at the timing of the first round, the second reagent dispensing probe 25 sucks the reagent from the reagent vessel 13 held on the reagent rack 14 in the reagent closet 16, and discharges the reagent into the reaction vessel 17 in the second reagent discharge position Pd.

In the (d+1)th cycle after the elapse of one cycle time from the dth cycle, the reaction vessel 17 stopped at the second reagent discharge position Pd in the dth cycle stops at the second stirring position Pe for the first time since cleaning. If stirring of the solution mixture from the second stirring position Pe is set at the timing of the first round, the second stirrer 27 stirs the solution mixture in the reaction vessel 17 in the second stirring position Pe.

In the fth cycle after the elapse of a predetermined number of cycle times from the (d+1)th cycle, the reaction vessel 17 stopped at the second stirring position Pe in the (d+1)th cycle stops at the first cleaning position W1 for the first time since cleaning. If the reaction vessel 17 contains a solution mixture for which it is determined that the reaction needs to be continued, the first cleaning nozzle 31 stops cleaning of the reaction vessel 17 in the first cleaning position W1. If the reaction vessel 17 contains a solution mixture for which it is determined that the reaction need not be continued, the first cleaning nozzle 31 cleans the reaction vessel 17 in the first cleaning position W1.

In the (f+4)th cycle after the elapse of four cycle times from the fth cycle, the reaction vessel 17 stopped at the first cleaning position W1 in the fth cycle stops at the second cleaning position W2. If cleaning of the reaction vessel 17 is stopped at the first cleaning position W1 in the fth cycle, the second cleaning nozzle 32 stops cleaning of the reaction vessel 17 in the second cleaning position W2. If the reaction vessel 17 is cleaned at the first cleaning position W1 in the fth cycle, the second cleaning nozzle 32 cleans the reaction vessel 17 in the second cleaning position W2.

In the (f+8)th cycle, (f+12)th cycle, (f+16)th cycle, (f+20)th cycle, and (f+24)th cycle after the elapse of multiples of four cycle times from the (f+4)th cycle, the reaction vessel 17 stopped at the second cleaning position W2 in the (f+4)th cycle stops at the third to seventh cleaning positions W3 to W7. If cleaning of the reaction vessel 17 is stopped at the second cleaning position W2 in the (f+4)th cycle, the third to seventh cleaning nozzles 33 to 37 stop cleaning of the reaction vessel 17 in the third to seventh cleaning positions W3 to W7. If the reaction vessel 17 is cleaned at the second cleaning position W2 in the (f+4)th cycle, the third to seventh cleaning nozzles 33 to 37 clean the reaction vessel 17 in the third to seventh cleaning positions W3 to W7.

In a state in which the seventh cleaning nozzle 37 having stopped cleaning is stopped in the upper stop position, a position where the reaction vessel 17 for test item analysis is stopped at the seventh cleaning position W7 in the (f+24)th cycle is the end position of the first round. The end position of the first round is the start position of the second round, and the reaction vessel 17 for which cleaning is stopped in the seventh cleaning position W7 stops in the order of the sample discharge position Pa, first reagent discharge position Pb, first stirring position Pc, second reagent discharge position Pd, second stirring position Pe, and cleaning position W in the second round.

When the number of rounds is two, the reaction vessel 17 for test item analysis is cleaned by the cleaning nozzle 30 when the reaction vessel 17 stops at the cleaning position W for the second time. A position where the seventh cleaning nozzle 37 having completed cleaning is stopped at the upper stop position is the end position of the second round. Then, the reaction vessel 17 is determined as a reaction vessel 17 for the next test item analysis.

Details of the operations of the measurement unit 29, data processor 60, and arithmetic unit 61 will now be explained.

The measurement unit 29 generates standard data and test data by measurement at the timing of the measurement section in which the timing of passing through the measurement position PM is set. Also, the measurement unit 29 generates reaction data by measurement at the timing of the determination section in which the timing of passing through the measurement position PM is set.

Then, the determination unit 50 performs determination. If the number of rounds is one, the measurement unit 29 generates standard data by measurement of a solution mixture of a standard sample and reagent at the timing of a first measurement section set in a section until the reaction vessel 17 containing the solution mixture stops at the cleaning position W for the first time since cleaning is performed in the cleaning position W. The arithmetic unit 61 generates calibration data based on the standard data generated by the measurement unit 29.

Also, the measurement unit 29 generates reaction data by measuring a solution mixture of a test sample and reagent at the timing of a determination section set in a section until the reaction vessel 17 containing the solution mixture stops at the cleaning position W for the first time since cleaning is performed in the cleaning position W. If it is determined based on the reaction data that continuation of the reaction of the solution mixture of the test sample and reagent is unnecessary, the measurement unit 29 generates test data by measuring the solution mixture at the timing of the first measurement section. If it is determined based on the reaction data that continuation of the reaction of the solution mixture of the test sample and reagent is necessary, the measurement unit 29 generates test data by measuring the solution mixture of the test sample and reagent at the timing of a second measurement section set in a section including the first measurement section and a section after the first measurement section, of a section until the reaction vessel 17 containing the solution mixture stops at the cleaning position W for the first time.

If it is determined that continuation of the reaction of the solution mixture of the test sample and reagent is unnecessary, the arithmetic unit 61 generates analytical data from the test data and calibration data generated by measuring the solution mixture at the timing of the first measurement section. If it is determined that continuation of the reaction of the solution mixture of the test sample and reagent is necessary, the arithmetic unit 61 generates analytical data from the test data and calibration data generated by measuring the solution mixture at the timing of the second measurement section.

As described above, analytical data can be generated at an early timing by performing measurement at the timing of the first measurement section if it is determined that continuation of the reaction is unnecessary. In addition, the reaction of a solution mixture can be continued for a long time period by performing measurement at the timing of the second measurement section if it is determined that continuation of the reaction is necessary. This makes accurate measurement possible.

Subsequently, the determination unit 50 performs determination. If the number of rounds is one and first and second standard samples are used to analyze a test item for which the range within which calibration data is analyzable is insufficient when using one standard sample, the measurement unit 29 generates first standard data by measuring a solution mixture of the first standard sample and a reagent at the timing of a first measurement section set in a section until the reaction vessel 17 containing the solution mixture stops at the cleaning position W for the first time since cleaning is performed in the cleaning position W, and generates second standard data by measuring a solution mixture of the second standard sample and reagent at the timing of a second measurement section set in a section including the first measurement section and a section after the first measurement section, of a section until the reaction vessel 17 containing the solution mixture stops at the cleaning position W for the first time. The arithmetic unit 61 generates first calibration data based on the first standard data, and second calibration data based on the second standard data.

The measurement unit 29 generates reaction data by measuring a solution mixture of a test sample and reagent at the timing of a determination section set in a section until the reaction vessel 17 containing the solution mixture stops at the cleaning position W for the first time since cleaning is performed in the cleaning position W. If it is determined based on the reaction data that continuation of the reaction of the solution mixture of the test sample and reagent is unnecessary, the measurement unit 29 generates test data by measuring the solution mixture at the timing of the first measurement section. If it is determined based on the reaction data that continuation of the reaction of the solution mixture of the test sample and reagent is necessary, the measurement unit 29 generates test data by measuring the solution mixture at the timing of the second measurement section.

If it is determined that continuation of the reaction of a solution mixture of a test sample and reagent is unnecessary, the arithmetic unit 61 generates analytical data from test data and first calibration data generated by measuring the solution mixture at the timing of the first measurement section. If it is determined that continuation of the reaction of the solution mixture of the test sample and reagent is necessary, the arithmetic unit 61 generates analytical data from test data and second calibration data generated by measuring the solution mixture at the timing of the second measurement section.

As described above, the range within which a test item component is analyzable can be extended by generating first calibration data by measuring a solution mixture of a first standard sample and reagent at the timing of the first measurement section, and generating second calibration data by measuring a solution mixture of a second standard solution and the reagent at the timing of the second measurement section. If it is determined that continuation of the reaction of a solution mixture of a test sample and reagent is unnecessary, analytical data can be generated at an early timing by using first calibration data for test data generated by measuring the solution mixture at the timing of the first measurement section. If it is determined that continuation of the reaction of a solution mixture of a test sample and reagent is necessary, measurement can accurately be performed by using second calibration data for test data generated by measuring the solution mixture at the timing of the second measurement section.

Then, the determination unit 50 performs determination. If the number of rounds is m (m is an integer of 2 or more), the measurement unit 29 generates standard data by measuring a solution mixture of a standard sample and reagent at the timing of a first measurement section set in a section until the reaction vessel 17 containing the solution mixture stops at the cleaning position W for the first time or the nth time ($2 \leq n \leq m$) since cleaning is performed in the cleaning position W. The arithmetic unit 61 generates calibration data based on the standard data.

The measurement unit 29 generates reaction data by measuring a solution mixture of a test sample and reagent at the timing of a determination section set in a section until the reaction vessel 17 containing the solution mixture stops at the cleaning position W for the first time or the nth time since cleaning is performed in the cleaning position W. If it is determined based on the reaction data that continuation of the reaction of the cleaning solution of the test sample and reagent is unnecessary, the measurement unit 29 generates test data by measuring the solution mixture at the timing of a first measurement section. If it is determined based on the reaction data that continuation of the reaction of the solution mixture of the test sample and reagent is necessary, the measurement unit 29 generates test data by measuring the solution mixture at the timing of a second measurement section set in a section including the first measurement section and a section after the first measurement section, of a section until the reaction vessel 17 containing the solution mixture stops at the cleaning position W for the mth time since cleaning is performed in the cleaning position W.

If it is determined that continuation of the reaction of a solution mixture of a test sample and reagent is unnecessary, the arithmetic unit 61 generates analytical data from test data and calibration data generated by measuring the solution mixture at the timing of the first measurement section. If it is determined that continuation of the reaction of a solution mixture of a test sample and reagent is necessary, the arithmetic unit 61 generates analytical data from test data and calibration data generated by measuring the solution mixture at the timing of the second measurement section.

As described above, if it is determined that continuation of the reaction is unnecessary, measurement can be performed at the timing of the first measurement section set in the section until the reaction vessel 17 stops at the cleaning position W for the first or nth time, and, if it is determined that continuation of the reaction is necessary, measurement can be performed at the timing of the second measurement section set in the section until the reaction vessel 17 stops at the cleaning position W for the mth time. Consequently, the reaction of a solution mixture of a test sample and reagent can be continued longer than that when measurement is performed at the timings of the first and second measurement sections until the reaction vessel 17 stops at the cleaning position W for the first time. Accordingly, analytical data can be generated at an early timing by performing measurement at the timing of the first measurement section. In addition, the reaction of the solution mixture can be continued for a long time by performing measurement at the timing of the second measurement section, so measurement can accurately be performed.

Subsequently, the determination unit 50 performs determination. If the number of rounds is m and standard samples are first and second standard samples, the measurement unit 29 generates first standard data by measuring a solution mixture of the first standard sample and a reagent at the timing of a first measurement section set in a section until the reaction vessel 17 containing the solution mixture stops at the cleaning position W for the first or nth time since cleaning is performed in the cleaning position W. Also, the measurement unit 29 generates second standard data by measuring a solution mixture of the second standard sample and reagent at the timing of a second measurement section set in a section including the first measurement section and a section after the first measurement section, of a section until the reaction vessel 17 containing the solution mixture stops at the cleaning position W for the mth time since cleaning is performed in the cleaning position W. The arithmetic unit 61 generates first calibration data based on the first standard data, and second calibration data based on the second standard data.

The measurement unit 29 generates reaction data by measuring a solution mixture of a test sample and reagent at the timing of a determination section set in a section until the reaction vessel 17 containing the solution mixture stops at the cleaning position W for the first or nth time since cleaning is performed in the cleaning position W. If it is determined based on the reaction data that continuation of the reaction of the solution mixture of the test sample and reagent is unnecessary, the measurement unit 29 generates test data by measuring the solution mixture at the timing of the first measurement section. If it is determined based on the reaction data that continuation of the solution mixture of the test sample and reagent is necessary, the measurement unit 29 generates test data by measuring the solution mixture at the timing of the second measurement section.

If it is determined that continuation of the reaction of the solution mixture of the test sample and reagent is unnecessary, the arithmetic unit 61 generates analytical data from the test data and first calibration data by measuring the solution mixture at the timing of the first measurement section. If it is determined that continuation of the reaction of the solution mixture of the test sample and reagent is necessary, the arithmetic unit 61 generates analytical data from the test data and second calibration data by measuring the solution mixture at the timing of the second measurement section.

Then, the determination unit 50 performs determination. If the number of rounds is m and reaction data includes first and second reaction data, the measurement unit 29 generates standard data by measuring a solution mixture of a standard sample and reagent at the timing of a first measurement section set in a section until the reaction vessel 17 containing the solution mixture stops at the cleaning position W for the first or nth time since cleaning is performed in the cleaning position W. The arithmetic unit 61 generates calibration data based on the standard data.

The measurement unit 29 generates first reaction data by measuring a solution mixture of a test sample and reagent at the timing of a first determination section set in a section until the reaction vessel 17 containing the solution mixture stops at the cleaning position W for the first or nth time since cleaning is performed in the cleaning position W. If it is determined based on the first reaction data that continuation of the reaction of the solution mixture of the test sample and reagent is necessary, the measurement unit 29 generates second reaction data by performing measurement at the timing of a second determination section set in a section including the first determination section and a section after the first determination section, of a section until the reaction vessel 17 containing the solution mixture of the test sample and reagent stops at the cleaning position W for the mth time.

If it is determined based on the first reaction data that continuation of the reaction of the solution mixture of the test sample and reagent is unnecessary, the measurement unit 29 generates test data by measuring the solution mixture of the test sample and reagent at the timing of a first measurement section. If it is determined based on the second reaction data that continuation of the reaction of the solution mixture of the test sample and reagent is unnecessary, the measurement unit 29 generates test data by measuring the solution mixture at the timing of a second measurement section set in a section including the first measurement section and a section after the first measurement section, of a section until the reaction vessel 17 stops at the cleaning position W for the mth time. If it is determined based on the second reaction data that continuation of the reaction of the solution mixture of the test sample and reagent is necessary, the measurement unit 29 generates test data by measuring the solution mixture at the timing of a third measurement section set in a section including the second measurement section and a section after the second measurement section, of a section until the reaction vessel 17 stops at the cleaning position W for the mth time.

If it is determined based on the first reaction data that continuation of the reaction of the solution mixture of the test sample and reagent is unnecessary, the arithmetic unit 61 generates analytical data from test data and calibration data generated by measuring the solution mixture at the timing of the first measurement section. If it is determined based on the second reaction data that continuation of the reaction of the solution mixture of the test sample and reagent is unnecessary, the arithmetic unit 61 generates analytical data from test data and calibration data generated by measuring the solution mixture at the timing of the second measurement section. Furthermore, if it is determined based on the second reaction data that continuation of the reaction of the solution mixture of the test sample and reagent is necessary, the arithmetic unit 61 generates analytical data from test data and calibration data generated by measuring the solution mixture at the timing of the third measurement section.

An example of the operation of the automatic analyzing apparatus 100 will be explained with reference to FIGS. 1, 2, 3, 4, 5, 6, 7, 8, 9, and 10. In the following description, an operation of analyzing test item A requiring first to third reagents larger in number than the first and second reagent dispensing probes 21 and 25 and requiring determination by the determination unit 50 and test item B requiring the first and second reagents and determination by the determination unit 50 will be explained.

First, when an input operation of setting analytical parameters of test item A is performed from the operation unit 80, the display unit 72 of the output unit 70 displays an analytical parameter setting screen.

FIG. 5 is a view showing an example of the analytical parameter setting screen for test item A displayed on the display unit 72. An analytical parameter setting screen 73 includes an "item" field for setting the item name of test item A, a "round" field for setting an integer of 1 or more as the number of rounds, a "reaction time" field for setting the reaction time of a sample and reagent of test item A, and a "sample parameters" field for setting the sample discharge timing of test item A.

The analytical parameter setting screen 73 also includes a "determination parameters" field for setting the determination conditions of the determination unit 50, a "reagent parameters" field for setting the reagent discharge timing of test item A, an "observation parameters" field for setting the measurement timing of the measurement unit 29 of the analyzer 10, and a "stirring parameters" field for setting the timing of stirring.

The analytical parameter setting screen 73 further includes, e.g., a "reaction sequence" field which displays a timing chart of dispensing of samples and reagents based on the settings in the fields of "round", "reaction time", and "reagent parameters". Each field displays an analytical parameter set by an input operation from the operation unit 80.

"A" as the item name of test item A is displayed in the "item" field. "2" indicating that the number of rounds is 2 is displayed in the "round" field. "T3" indicating that the reaction time for analyzing test item A is maximally a time T3 is displayed in the "reaction time" field.

The "sample parameters" field includes, e.g., a "discharge amount (ML)" field for setting the amount of sample to be discharged to the reaction vessel 17, and a "discharge round" field for setting the timing at which the sample is discharged to the reaction vessel 17. In the "discharge amount (4L)" field, "5" indicating that 5 µL of a standard sample or test sample for analyzing test item A are discharged into the reaction vessel 17 for analyzing test item A is displayed. In the "discharge round" field, "1" indicating that a sample for analyzing test item A is to be discharged to the reaction vessel 17 for analyzing test item A, which stops at the sample discharge position Pa in the first round, is displayed.

When 2 is set as the number of rounds as described above, a sample can be discharged at two timings to the reaction vessel 17 for analyzing test item A in the sample discharge position Pa, and it is possible to perform setting such that a sample for analyzing test item A is discharged in the first round as the first one of the two timings.

Note that when 2 is set as the number of rounds, it is possible to form two "discharge amount (µL)" fields and two "discharge round" fields in the "sample parameters" field, set the amount of sample in each of the two "discharge amount (µL)" fields, and set 1 and 2 in the two "discharge round" fields. In this case, the sample can be discharged at two timings, i.e., in the first and second rounds.

The "determination parameters" field includes an "execute" field for setting whether to allow the determination unit 50 to execute determination, a "determination round" field for setting the timing of measurement for generating reaction data to be determined, and a "criteria" field for setting criteria for determining whether to continue the reaction. In the "execute" field, "v" indicating that the determination unit 50 executes determination is displayed in the square frame.

In the "determination round" field, "1" indicating that the timing of measurement for generating reaction data is the first round is displayed. Note that a value falling within the range of the number of rounds set in the "round" field can be set in the "determination round" field. When "2" is displayed, therefore, the timing of measurement for generating reaction data is the second round.

In the "criteria" field, "A>1.5, ΔA>0.2" indicating the criteria is displayed. The criteria are set based on the reaction characteristic of a solution mixture of test item A. When measuring a solution mixture of a test sample containing a high-concentration component of test item A, the absorbance may rise to the detection limit in the middle of the reaction in the first round, thereby decreasing the measurement accuracy or making measurement impossible. Accordingly, criteria capable of detecting the absorbance or a change in absorbance before the absorbance reaches the detection limit of the first round are set.

In this case, if reaction data contains an absorbance exceeding 1.5 Abs as the set criterion, or if reaction data contains an absorbance change exceeding 0.2 Abs/min per unit time as the set criterion, the measurement accuracy may decrease or measurement may become impossible, so the determination unit 50 determines that the reaction of a solution mixture for analyzing test item A needs to be continued to the second round. If reaction data contains an absorbance of 1.5 Abs or less accurately measurable by the measurement unit 29, and contains an absorbance change of 0.2 Abs/min or less per unit time, the determination unit 50 determines that the reaction of the solution mixture for analyzing test item A need not be continued.

The "reagent parameters" field includes a "reagent" field for setting a reagent for analyzing test item A, a "reagent name" field for setting, e.g., a reagent name for identifying the set reagent, a "discharge amount (IL)" field for setting an amount of reagent to be discharged to the reaction vessel, a "discharge position" field for setting a reagent discharge position at which the reagent is discharged to the reaction vessel 17, and a "discharge round" field for setting the timing at which the reagent is discharged to the reaction vessel 17.

The "reagent" field shows that the reagent of test item A includes three reagents, i.e., first to third reagents. In the "reagent" field, "R1" indicating the first reagent to be initially discharged to the reaction vessel 17 for analyzing test item A is displayed, and "R2" indicating the second reagent to be discharged after the first reagent is discharged is displayed. In addition, "R3" indicating the third reagent to be discharged after the second reagent is discharged if it is determined that continuation of the reactions of the solution mixtures of the first and second reagents is necessary is displayed.

In the "reagent name" field, "A1" indicating that the name of the first reagent to be used to analyze test item A is reagent A1 is displayed, "A2" indicating that the name of the second reagent is reagent A2 is displayed, and "A3" indicating that the name of the third reagent is reagent A3 is displayed.

In the "discharge amount (μL)" field, "100" indicating that the amount of first reagent to be discharged to the reaction vessel 17 for analyzing test item A is 100 μL is displayed. Also, "50" indicating that the amount of second reagent to be discharged to the reaction vessel 17 for analyzing test item A is 50 μL is displayed. In addition, "20" indicating that the amount of third reagent to be discharged to the reaction vessel 17 for analyzing test item A is 20 μL is displayed.

In the "discharge position" field and "discharge round" field, "Pb" and "1" indicating that the first reagent is to be discharged into the reaction vessel 17 for analyzing test item A, which stops at the first reagent discharge position Pb in the first round, are displayed. Also, "Pd" and "1" indicating that the second reagent is to be discharged into the reaction vessel 17 for analyzing test item A, which stops at the second reagent discharge position Pd in the first round, are displayed. In addition, "Pb" and "2" indicating that if it is determined that continuation of the reaction of the solution mixture for analyzing test item A is necessary, the third reagent is to be discharged into the reaction vessel 17 for analyzing test item A, which stops at the first reagent discharge position Pb in the second round, are displayed.

If it is determined that continuation of the reaction of the solution mixture of the test sample, first reagent, and second reagent is necessary, the test sample contains the component of test item A at a high concentration. As the third reagent of test item A, therefore, a reagent having a component capable of diluting the solution mixture of the test sample, first reagent, and second reagent such that the reagent component which reacts with the component of test item A does not become insufficient is used.

As described above, when 2 is set as the number of rounds, the reagent can be discharged at two timings to the reaction vessel 17 for analyzing test item A in the first reagent discharge position Pb, and it is possible to perform setting such that the first reagent is discharged in the first round as the first timing, and the third reagent is discharged in the second round as the second timing if it is determined that continuation of the reaction is necessary. Also, the reagent can be discharged at two timings to the reaction vessel 17 for analyzing test item A in the second reagent discharge position Pd, and it is possible to perform setting such that the second reagent is discharged in the first round as the first one of the two timings.

The "observation parameters" field includes a "main observation section" field and "sub observation section" field for setting the timing of measurement for generating standard data and test data, and a "determination observation section" field for setting the timing of measurement for generating reaction data.

In the "main observation section" field, the timing of measurement of a solution mixture in which the component of test item A and a reagent are reacting with each other or a solution mixture in which the reaction is complete is set. That is, "31-33" is displayed which indicates that if it is determined that continuation of the reaction of a solution mixture for analyzing test item A is unnecessary, the solution mixture for analyzing test item A is measured at the timing of a first measurement section M1A as a section of the first round in which the reaction vessel 17 for analyzing test item A, which stops at the first reagent discharge position Pb for the first time and then passes through the measurement point PM for the first time since cleaning is performed, passes through the measurement position PM for the 31st to 33rd times.

In this case, to be able to complete measurement of a solution mixture of a test sample for analyzing test item A and first and second reagents in the first round if it is determined that continuation of the reaction of the solution mixture is unnecessary, the first measurement section M1A is set in a section until the reaction vessel 17 for analyzing test item A stops at the cleaning position W for the first time since the second reagent is discharged to the reaction vessel 17 for analyzing test item A.

Also, "55-57" is displayed which indicates that if it is determined that continuation of the reaction of the solution mixture for analyzing test item A is necessary, the solution mixture for analyzing test item A is measured at the timing of a second measurement section M2A set in a section until the reaction vessel 17 for analyzing test item A stops at the second reagent discharge position Pd for the second time, which includes the first measurement section M1A and a section after the first measurement section M1A, as a section in the second round in which the reaction vessel 17 for analyzing test item A, which stops at the first reagent discharge position Pb for the first time and then passes through the measurement position PM for the first time since cleaning is performed, passes through the measurement position PM for the 55th to 57th times.

Note that time T3 set in the "reaction time" field corresponds to the time at which the reaction vessel 17 for analyzing test item A stops at the second reagent discharge position Pd for the second time, and hence is the endmost timing by which the timing of stop at the second reagent discharge position Pd for the second time can be set.

In this case, to be able to complete measurement of a solution mixture of a test sample for analyzing test item A and first, second, and third reagents in the second round if it is determined that continuation of the reaction of a solution mixture of the test sample for analyzing test item A and the first and second reagents is necessary, the second measurement section M2A is set in a section until the reaction vessel 17 for analyzing test item A stops at the cleaning position W for the second time since the third reagent is discharged to the reaction vessel 17 for analyzing test item A.

In the "sub observation section" field, setting is performed in accordance with the necessity of correction of, e.g., the color of a solution mixture before the component of test item A and a reagent react with each other. That is, "14-16" is displayed which indicates that if it is determined that continuation of the reaction of a solution mixture for analyzing test item A is unnecessary, the solution mixture for analyzing test item A is measured at the timing of a first sub measurement section S1A as a section of the first round in which the reaction vessel 17 for analyzing test item A, which stops at the first reagent discharge position Pb for the first time and then passes through the measurement position PM for the first time since cleaning is performed, passes through the measurement position PM for the 14th to 16th times.

Also, "40-45" is displayed which indicates that the solution mixture for analyzing test item A is measured at the timing of a second sub measurement section S2A as a section of the second round in which the reaction vessel 17 for analyzing test item A, which stops at the first reagent discharge position Pb for the first time and then passes through the measurement position PM for the first time since cleaning is performed, passes through the measurement position PM for the 40th to 45th times.

In the "determination observation section" field, the timing of measurement capable of detecting that the detection limit is almost reached in the first measurement section M1A set in the "main observation section" when measuring a solution mixture of a test sample containing the component of test item A at a high concentration is set. That is, "30-33" is displayed which indicates that the solution mixture for analyzing test item A is measured at the timing of a determination section JA as a section of the first round in which the reaction vessel 17 for analyzing test item A, which stops at the first reagent discharge position Pb for the first time and then passes through the measurement position PM for the first time since cleaning is performed, passes through the measurement position PM for the 30th to 33rd times.

A standard sample for analyzing test item A includes at least first and second standard samples. The first standard sample is used to determine that continuation of the reaction is unnecessary. The second standard sample is used to determine that continuation of the reaction is necessary, and contains the component of test item A at a concentration higher than that of the first standard sample. Note that there is a test item using identical first and second standard solutions depending on the reaction characteristic of a solution mixture.

The arithmetic unit 61 generates first calibration data based on first standard data generated by measuring a solution mixture of the first standard sample for analyzing test item A, which is used to determine that continuation of the reaction is unnecessary, and first and second reagents, at the timings of the first measurement section M1A and second sub measurement section S1A set in the "main observation section" field and "sub observation section" field. Also, the arithmetic unit 61 generates second calibration data based on second standard data generated by measuring a solution mixture of the second standard sample for analyzing test item A, which is used to determine that continuation of the reaction is necessary, and first to third reagents, at the timings of the second measurement section M2A and second sub measurement section S2A set in the "main observation section" field and "sub observation section" field.

The "stirring parameters" field includes a "stirring position" field for setting a stirring position for stirring a solution mixture, and a "stirring round" field for setting the timing at which the solution mixture is stirred. "Pc" and "1" indicating that a solution mixture in the reaction vessel 17 for analyzing test item A, which stops at a first stirring position Pc in the first round, is stirred are displayed. Also, "Pe" and "1" indicating that a solution mixture in the reaction vessel 17 for analyzing test item A, which stops at a second stirring position Pe in the first round, is stirred are displayed. In addition, "Pc" and "2" indicating that a solution mixture for analyzing test item A in the reaction vessel 17 for analyzing test item A, which stops at the first stirring position Pc in the second round, is stirred if it is determined that continuation of the reaction of the solution mixture is necessary are displayed.

As described above, when 2 is set as the number of rounds, a solution mixture in the reaction vessel 17 for analyzing test item A can be stirred at two timings in the first stirring position Pc, and it is possible to perform setting such that the solution mixture is stirred in the first round as the first timing, and to perform setting such that the solution mixture is stirred in the second round as the second timing if it is determined that continuation of the reaction is necessary. Also, a solution mixture in the reaction vessel 17 for analyzing test item A can be stirred at two timings in the second stirring position Pe, and it is possible to perform setting so that stirring is performed in the first round as the first timing.

The timing chart displayed in the "reaction sequence" field includes two arrows 1R and 2R indicating the first and second rounds corresponding to the number of rounds set in the "round" field. The timing chart also includes "T1" indicating a time T1 until the reaction vessel 17 for analyzing test item A stops at the second reagent discharge position Pd for the first time in the first round since the reaction vessel 17 stops at the first reagent discharge position Pb for the first time in the first round, "T2" indicating a time T2 until the reaction vessel 17 stops at the first reagent discharge position Pb for the second time in the second round since then, "T3" indicating a time T3 until the reaction vessel 17 stops at the second reagent discharge position Pd for the second time in the second round since then, and a rightward arrow indicating the time until T3 as the reaction time.

The timing chart further includes "S" and a downward arrow indicating that a sample for analysis is discharged when the reaction vessel 17 for analyzing test item A stops at the sample discharge position Pa in the first round.

In addition, the timing chart includes "R1", "100 µL", and a downward arrow indicating that 100 µL of a first reagent are discharged when the reaction vessel 17 for analyzing test item A stops at the first reagent discharge position Pb in the first round, "R2", "50 µL", and a downward arrow indicating that 50 µL of a second reagent are discharged when the reaction vessel 17 stops at the second reagent discharge position Pd in the first round, and "R3", "20 µL", and a downward arrow indicating that 20 µL of a third reagent are discharged when the reaction vessel 17 stops at the first reagent discharge position Pb in the second round if it is determined that continuation of the reaction is necessary.

Note that when "100 µL" as the reagent amount of the first reagent displayed in the "reaction sequence" field is changed to, e.g., "90 µL" by operating the mouse and keyboard of the operation unit 80, it is possible to change "100" to "90" displayed in the "reagent amount (µL)" and discharge 90 µL of the first reagent.

By displaying the reagent dispensing timing chart on the display unit 72 as described above, the operator can readily grasp the whole contents of the reaction such as the dispensing timing of reagents for test time A, the reagent amounts, and the reaction time.

The analysis controller 42 controls the mechanical unit 41 based on the analytical parameters displayed on the analytical parameter setting screen 73, thereby operating each analytical unit of the analyzer 10.

In the first round, the sample dispensing probe 19 discharges 5 µL of a test sample into the reaction vessel 17 for analyzing test item A, which stops at the sample discharge position Pa for the first time since cleaning is performed by the seventh cleaning nozzle 37 of the cleaning nozzle 30 in the seventh cleaning position W7 of the cleaning position W. The first reagent dispensing probe 21 discharges 100 µL of a first reagent into the reaction vessel 17 for analyzing test item A, which stops at the first reagent discharge position Pb for the first time and into which the test sample is discharged. The first stirrer 23 stirs the solution mixture in the reaction vessel 17 for analyzing test item A, which stops at the first stirring position Pc for the first time. The second reagent dispensing probe 25 discharges 50 µL of a second reagent into the reaction vessel 17 for analyzing test item A, which stops at the second reagent discharge position Pd for the first time. The second stirrer 27 stirs the solution mixture in the reaction vessel 17 for analyzing test item A, which stops at the second stirring position Pe for the first time.

Figure 6:
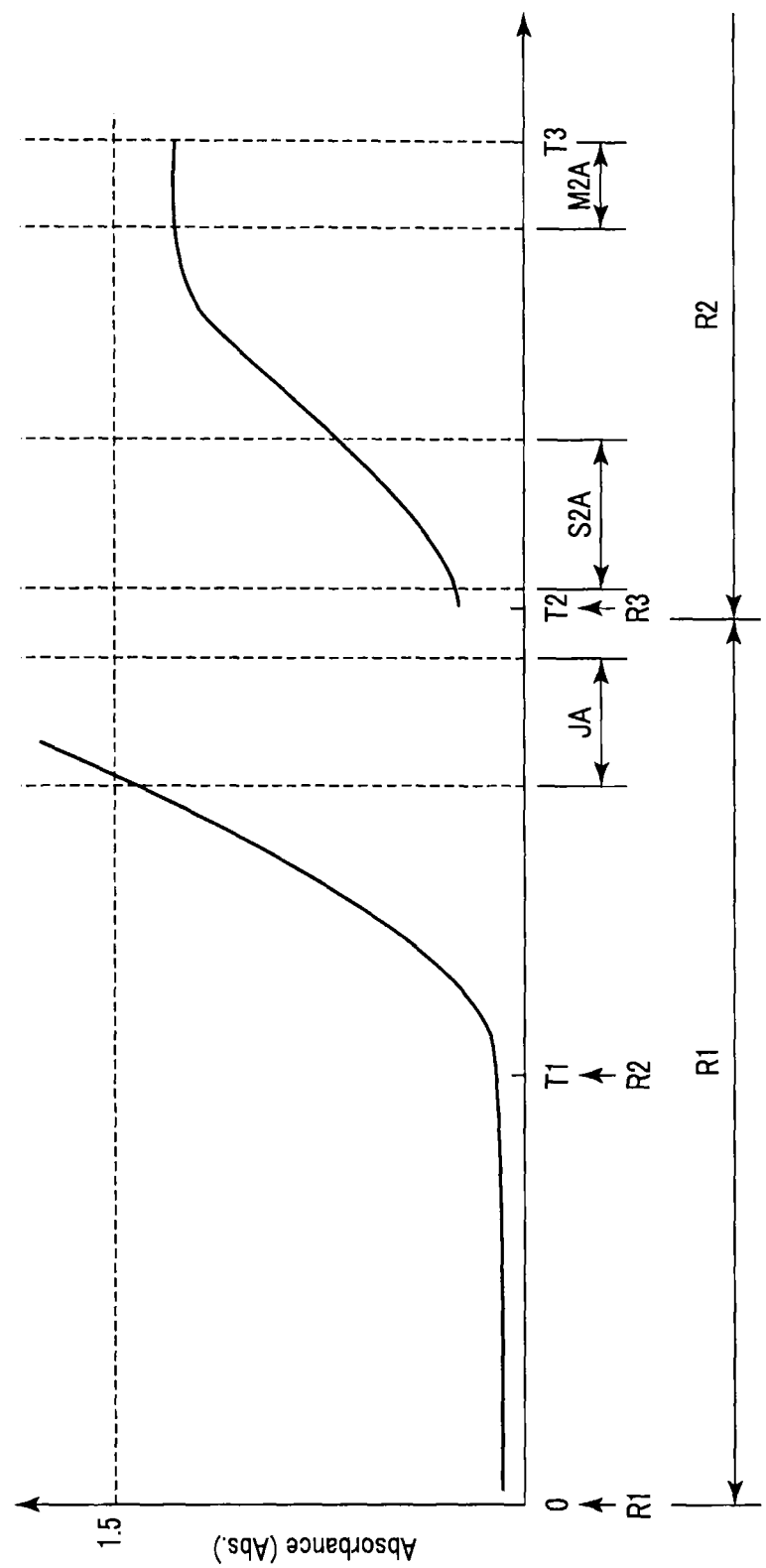
FIG. 6 is a view showing an example when it is determined that the continuation of a reaction is necessary according to the embodiment.

As shown in FIG. 6, the measurement unit 29 generates reaction data by measuring a solution mixture for analyzing test item A at the timing of the determination section JA. The determination unit 50 performs determination based on the reaction data generated by the measurement unit 29. Since the absorbance has risen and the reaction data contains an absorbance exceeding 1.5 Abs in the determination section JA, the determination unit 50 determines that continuation of the reaction is necessary.

The cleaning nozzle 30 stops cleaning the reaction vessel 17 for analyzing test item A, which stops at the cleaning position W for the first time since cleaning is performed.

As described above, if it is determined that continuation of the reaction is necessary when 2 is set as the number of rounds, cleaning of the reaction vessel 17 for analyzing test item A, which stops at the cleaning position W in the first round, is stopped. This makes it possible to continue the reaction of the solution mixture of the test sample and first and second reagents instead of terminating the reaction in the first round.

In the second round, the sample dispensing probe 19 stops discharging the test sample into the reaction vessel 17 for analyzing test item A, which stops at the sample discharge position Pa for the second time since cleaning is performed. The first reagent dispensing probe 21 discharges a third reagent into the reaction vessel 17 for analyzing test item A, which stops at the first reagent discharge position Pb for the second time. The first stirrer 23 stirs the solution mixture in the reaction vessel 17 for analyzing test item A, which stops at the first stirring position Pc for the second time.

The second reagent dispensing probe 25 stops discharging the reagent into the reaction vessel 17 for analyzing test item A, which stops at the second reagent discharge position Pd for the second time. The second stirrer 27 stops stirring the solution mixture in the reaction vessel 17 for analyzing test item A, which stops at the second stirring position Pe for the second time. The cleaning nozzle 30 cleans the interior of the reaction vessel 17 for analyzing test item A, which stops at the cleaning position W for the second time since cleaning is performed. Thus, the use of the reaction vessel 17 for analyzing test item A is finished in the second round.

As shown in FIG. 6, the measurement unit 29 generates test data by measuring the solution mixture containing the third reagent for analyzing test item A at the timings of the second measurement section M2A and second sub measurement section S2A in the second round. The arithmetic unit 61 generates analytical data from the test data generated by the measurement unit 29 and the second calibration data. The output unit 70 outputs the analytical data of test item A at the timing at which the reaction vessel 17 for analyzing test item A stops at the second reagent discharge position Pd for the second time, as the timing of the time T3 set in the "reaction time" field of the analytical parameter setting screen 73.

As described above, if it is determined that continuation of the reaction is necessary, measurement is performed after the third reagent is discharged to the reaction vessel 17 containing the solution mixture for analyzing test item A at the timing of the second round. This makes it possible to accurately measure the solution mixture for analyzing test item A, which decreases the measurement accuracy or makes measurement impossible at the timing of the first round. Consequently, analytical data can be obtained without any remeasurement, so it is possible to reduce the load on the operator and rapidly perform tests.

Figure 7:
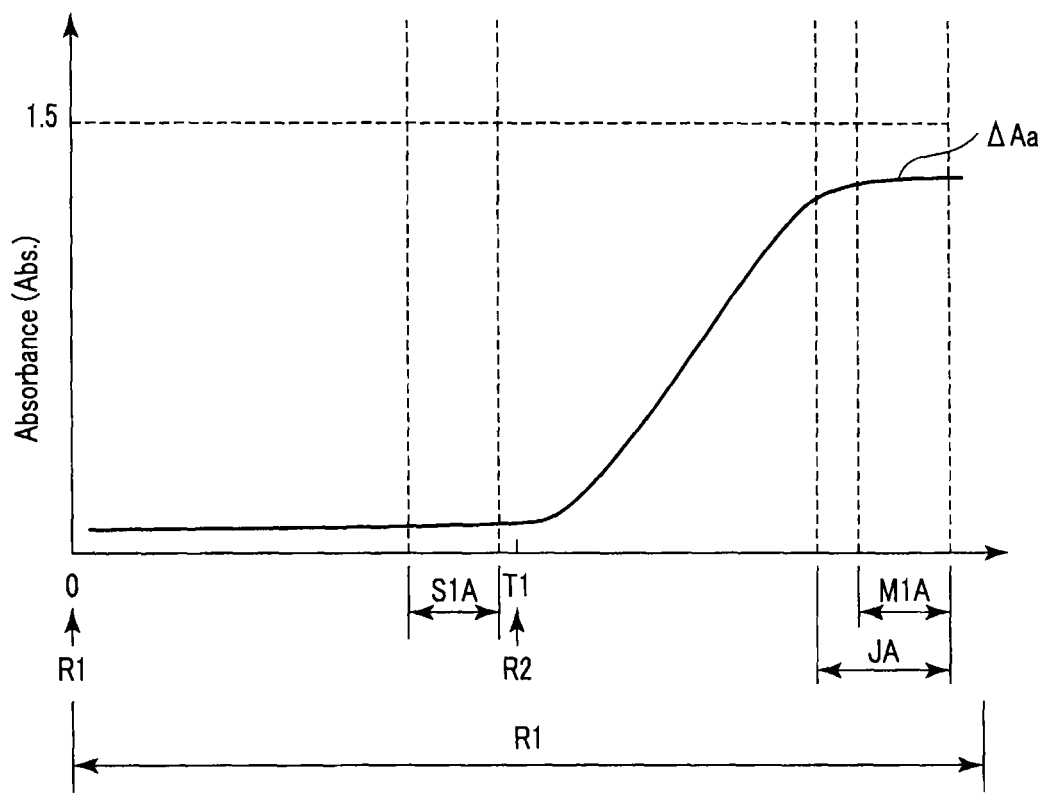
FIG. 7 is a view showing an example when it is determined that the continuation of a reaction is unnecessary according to the embodiment.

Note that as shown in FIG. 7, the determination unit 50 determines that continuation of the reaction is unnecessary if reaction data having an absorbance of 1.5 Abs or less is obtained by measurement at the timing of the determination section JA, and reaction data having an absorbance change amount $\Delta Aa$ by which an absorbance change per unit time is 0.2 Abs/min or less is generated. The measurement unit 29 generates test data by measuring the solution mixture for analyzing test item A at the timings of the first measurement section M1A and first sub measurement section S1A in the first round. The arithmetic unit 61 generates analytical data from the test data generated by the measurement unit 29 and the first calibration data. The cleaning nozzle 30 cleans the interior of the reaction vessel 17 for analyzing test item A, which stops at the cleaning position W for the first time since cleaning is performed. In the first round, the use of the reaction vessel 17 for analyzing test item A is finished. The output unit 70 outputs the analytical data of test item A at, e.g., the timing at which the reaction vessel 17 of test item A stops at the cleaning position W for the first time. Since the operation is terminated in the first round, the first reagent dispensing probe 21 stops discharging the third reagent to the reaction vessel 17 for analyzing test item A.

As described above, if it is determined that continuation of the reaction is unnecessary, the measurement of the solution mixture for analyzing test item A is finished in the first round, so the analytical data of test item A can be output at a timing earlier than that when continuation of the reaction is necessary. It is also possible to clean the reaction vessel 17 for analyzing test item A at a timing earlier than that when continuation of the reaction is necessary.

When an input operation of setting analytical parameters of test item B is performed from the operation unit 80 after that, the display unit 72 of the output unit 70 displays an analytical parameter setting screen.

FIG. 8 is a view showing an example of the test item B analytical parameter setting screen displayed on the display unit 72. Like the analytical parameter setting screen 73 shown in FIG. 5, an analytical parameter setting screen 74 includes, e.g., fields of "item", "round", "reaction time", "sample parameters", "determination parameters", "reagent parameters", "observation parameters", "stirring parameters", and "reaction sequence". Each analytical parameter set by an input operation from the operation unit 80 is displayed in a corresponding field.

"B" indicating the item name of test item B is displayed in the "item" field. "2" indicating that the number of rounds is 2 is displayed in the "round" field. "T3" indicating that a reaction time for analyzing test item B is maximally a time T3 is displayed in the "reaction time" field.

The "sample parameters" field includes, e.g., a "discharge amount (µL)" field and "discharge round" field. In the discharge amount (µL)" field, "5" indicating that 5 of each of a standard sample and test sample for analyzing test item B are discharged into the reaction vessel 17 for analyzing test item B is displayed. In the "discharge round" field, "1" indicating that each sample for analyzing test item B is discharged to the reaction vessel 17 for analyzing test item B, which stops at the sample discharge position P in the first round is displayed.

The "determination parameters" field includes fields of "execute", "determination round", and "criteria". In the "execute" field, "v" indicating that the determination unit 50 executes determination is displayed in the square frame. In the "determination round" field, "1" indicating that the timing of measurement for generating reaction data to be determined is the first round is displayed.

In the "criteria" field, "ΔA<0.01, A<0.15" indicating the criteria is displayed. The criteria are set based on the reaction characteristic of a solution mixture of test item B. If measurement is performed on a solution mixture of a test sample containing a component of test item B at a low concentration and a reagent even though the component of test item B requires a high accuracy in, e.g., a low-concentration region, a change in absorbance is small, so the measurement cannot accurately be performed. Accordingly, criteria capable of detecting an absorbance which changes little are set.

In this case, if reaction data contains an absorbance change lower than 0.01 Abs/min as the set criterion, or if reaction data contains an absorbance lower than 0.15 Abs as the set criterion, the determination unit 50 determines that the reaction of a solution mixture for analyzing test item B needs to be continued. If reaction data contains an absorbance change of 0.01 Abs/min or more per unit time, and contains an absorbance of 0.15 Abs or more, the determination unit 50 determines that the reaction of the solution mixture for analyzing test item B need not be continued.

The "reagent parameters" field includes fields of "reagent", "reagent name", "discharge amount (IL)", "discharge position", and "discharge round". The "reagent" field shows that the reagent of test item B includes two reagents, i.e., first and second reagents. In the "reagent" field, "R1" indicating the first reagent to be dispensed first is displayed, and "R2" indicating the second reagent to be dispensed after the first reagent is dispensed is displayed.

In the "reagent name" field, "B1" indicating that the name of the first reagent to be used to analyze test item B is reagent B1 is displayed, and "B2" indicating that the name of the second reagent is reagent B2 is displayed. In the "discharge amount (μL)" field, "80" indicating that the amount of first reagent to be discharged into the reaction vessel 17 for analyzing test item B is 80 μL is displayed. Also, "50" indicating that the amount of second reagent to be discharged to the reaction vessel 17 for analyzing test item B is 50 μL is displayed.

In the "discharge position" field and "discharge round" field, "Pb" and "1" indicating that the first reagent is to be discharged into the reaction vessel 17 for analyzing test item B, which stops at the first reagent discharge position Pb in the first round, are displayed. Also, "Pd" and "1" indicating that the second reagent is to be discharged into the reaction vessel 17 for analyzing test item B, which stops at the second reagent discharge position Pd in the first round, are displayed.

The "observation parameters" field includes fields of "main observation section", "sub observation section", and "determination observation section".

In the "main observation section" field, a timing capable of measuring a solution mixture in which the component of test item B and a reagent are reacting with each other or a solution mixture in which the reaction is complete is set. That is, "21-33" is displayed which indicates that if it is determined that continuation of the reaction of a solution mixture for analyzing test item B is unnecessary, the solution mixture for analyzing test item B is measured at the timing of a first measurement section M1B as a section of the first round in which the reaction vessel 17 for analyzing test item B, which stops at the first reagent discharge position Pb for the first time and then passes through the measurement point PM for the first time since cleaning is performed, passes through the measurement position PM for the 21st to 33rd times.

In this case, to be able to complete measurement of a solution mixture of a test sample for analyzing test item B and first and second reagents in the first round if it is determined that continuation of the reaction of the solution mixture is unnecessary, the first measurement section M1B is set in a section until the reaction vessel 17 for analyzing test item B stops at the cleaning position W for the first time since the second reagent is discharged to the reaction vessel 17 for analyzing test item B.

Also, "21-57" is displayed which indicates that if it is determined that continuation of the reaction of the solution mixture for analyzing test item B is necessary, the solution mixture for analyzing test item B is measured at the timing of a second measurement section M2B set in a section until the reaction vessel 17 for analyzing test item B stops at the second reagent discharge position Pd for the second time, which includes the first measurement section M1B and a section after the first measurement section M1B, as a section in the first and second rounds in which the reaction vessel 17 for analyzing test item B, which stops at the first reagent discharge position Pb for the first time and then passes through the measurement position PM for the first time since cleaning is performed, passes through the measurement position PM for the 21st to 57th times.

Note that time T3 set in the "reaction time" field corresponds to the time at which the reaction vessel 17 for analyzing test item B stops at the second reagent discharge position Pd for the second time, and hence is the endmost timing by which the timing of stop at the second reagent discharge position Pd for the second time can be set.

In this case, to be able to complete measurement of a solution mixture of a test sample for analyzing test item B and first and second reagents in the second round if it is determined that continuation of the reaction of the solution mixture is necessary, the second measurement section M2B is set in a section until the reaction vessel 17 for analyzing test item B stops at the cleaning position W for the second time since the second reagent is discharged to the reaction vessel 17 for analyzing test item B.

In the "sub observation section" field, setting is performed in accordance with the necessity of correction of, e.g., the color of a solution mixture before the component of test item B and a reagent react with each other. That is, "10-16" is displayed which indicates that if it is determined that continuation of the reaction of a solution mixture for analyzing test item B is unnecessary, the solution mixture for analyzing test item B is measured at the timing of a first sub measurement section S1B as a section of the first round in which the reaction vessel 17 for analyzing test item B, which stops at the first reagent discharge position Pb for the first time and then passes through the measurement position PM for the first time since cleaning is performed, passes through the measurement position PM for the 10th to 16th times.

Also, "10-16" is displayed which indicates that the solution mixture for analyzing test item B is measured at the timing of a second sub measurement section S2B as a section of the first round in which the reaction vessel 17 for analyzing test item B, which stops at the first reagent discharge position Pb for the first time and then passes through the measurement position PM for the first time since cleaning is performed, passes through the measurement position PM for the 10th to 16th times.

In the "determination observation section" field, a timing capable of detecting that a change in absorbance is small when measuring a solution mixture of a test sample containing the component of test item B at a low concentration is set. That is, "30-33" is displayed which indicates that the solution mixture for analyzing test item B is measured at the timing of a determination section JB as a section of the first round in which the reaction vessel 17 for analyzing test item B, which stops at the first reagent discharge position Pb for the first time and then passes through the measurement position PM for the first time since cleaning is performed, passes through the measurement position PM for the 30th to 33rd times.

By setting the execution of determination in the "determination parameters" field, the determination unit 50 performs determination based on reaction data generated by measurement performed at the timing of the determination section JB set in the "determination observation section" field, and based on the criteria set in the "criteria" field.

Note that it is also possible to set the determination section JB as, e.g., a first determination section, generate first reaction data by measurement performed at the timing of the first determination section, and, if it is determined based on the first reaction data that continuation of the reaction of a solution mixture of a test sample and first and second reagents is necessary, set a second determination section in a section including the first determination section and a section after the first determination section, of a section in which the reaction vessel 17 containing the solution mixture stops at the cleaning position W for the second time since cleaning is performed in the cleaning position W, and generate second reaction data by measurement performed at the timing of the second determination section. In this case, if it is determined based on the second reaction data that continuation of the reaction is unnecessary, a second measurement section is set in a section including the first measurement section M1B and a section after the first measurement section M1B, of a section until the reaction vessel 17 for analyzing test item B stops at the cleaning position W for the second time, and a third measurement section is set in a section including the second measurement section and a section after the second measurement section.

The arithmetic unit 61 of the data processor 60 generates calibration data based on standard data generated by measuring a solution mixture of a standard sample for analyzing test item B at the timings of the first measurement section M1B and second sub measurement section S1B set in the "main observation section" field and "sub observation section" field.

Note that when the second and third measurement sections as the timings of measurement based on the second reaction data are set, analytical data is generated based on test data generated by measuring a solution mixture of a test sample and reagent at the timing of the first measurement section M1B if it is determined based on the first reaction data that continuation of the reaction of the solution mixture is unnecessary, analytical data is generated based on test data generated by measuring a solution mixture of a test sample and reagent at the timing of the second measurement section if it is determined based on the second reaction data that continuation of the reaction of the solution mixture is unnecessary, and analytical data is generated by measuring a solution mixture of a test sample and reagent at the timing of the third measurement section if it is determined based on the second reaction data that continuation of the reaction of the solution mixture is necessary.

The "stirring parameters" field includes a "stirring position" field and "stirring round" field, and "Pc" and "1" indicating that a solution mixture in the reaction vessel 17 for analyzing test item B, which stops at a first stirring position Pc in the first round, is stirred are displayed. Also, "Pe" and "1" indicating that a solution mixture in the reaction vessel 17 for analyzing test item B, which stops at a second stirring position Pe in the first round, is stirred are displayed.

The timing chart displayed in the "reaction sequence" field includes two arrows 1R and 2R indicating the first and second rounds corresponding to the number of rounds set in the "round" field. The timing chart also includes "T1" indicating a time T1 until the reaction vessel 17 for analyzing test item B stops at the second reagent discharge position Pd for the first time in the first round since the reaction vessel 17 stops at the first reagent discharge position Pb for the first time in the first round, "T2" indicating a time T2 until the reaction vessel 17 stops at the first reagent discharge position Pb for the second time in the second round since then, "T3" indicating a time T3 until the reaction vessel 17 stops at the second reagent discharge position Pd for the second time in the second round since then, and a rightward arrow indicating the time until T3 as the reaction time.

The timing chart further includes "S" and a downward arrow indicating that a sample for analysis is discharged when the reaction vessel 17 for analyzing test item B stops at the sample discharge position Pa in the first round.

In addition, the timing chart includes "R1", "80 µL", and a downward arrow indicating that 80 µL of a first reagent are discharged when the reaction vessel 17 for analyzing test item B stops at the first reagent discharge position Pb in the first round, and "R2", "50 µL", and a downward arrow indicating that 50 pa, of a second reagent are discharged when the reaction vessel 17 stops at the second reagent discharge position Pd in the first round.

The analysis controller 42 controls the mechanical unit 41 based on the analytical parameters displayed on the analytical parameter setting screen 74, thereby operating each analytical unit of the analyzer 10.

In the first round, the sample dispensing probe 19 discharges 5 µL of a test sample into the reaction vessel 17 for analyzing test item B, which stops at the sample discharge position Pa for the first time since cleaning is performed by the seventh cleaning nozzle 37 of the cleaning nozzle 30 in the seventh cleaning position W7 of the cleaning position W. The first reagent dispensing probe 21 discharges 80 µL of a first reagent into the reaction vessel 17 for analyzing test item B, which stops at the first reagent discharge position Pb for the first time and into which the test sample is discharged. The first stirrer 23 stirs the solution mixture in the reaction vessel 17 for analyzing test item B, which stops at the first stirring position Pc for the first time. The second reagent dispensing probe 25 discharges 50 µL of a second reagent into the reaction vessel 17 for analyzing test item B, which stops at the second reagent discharge position Pd for the first time. The second stirrer 27 stirs the solution mixture in the reaction vessel 17 for analyzing test item B, which stops at the second stirring position Pe for the first time.

Figure 9:
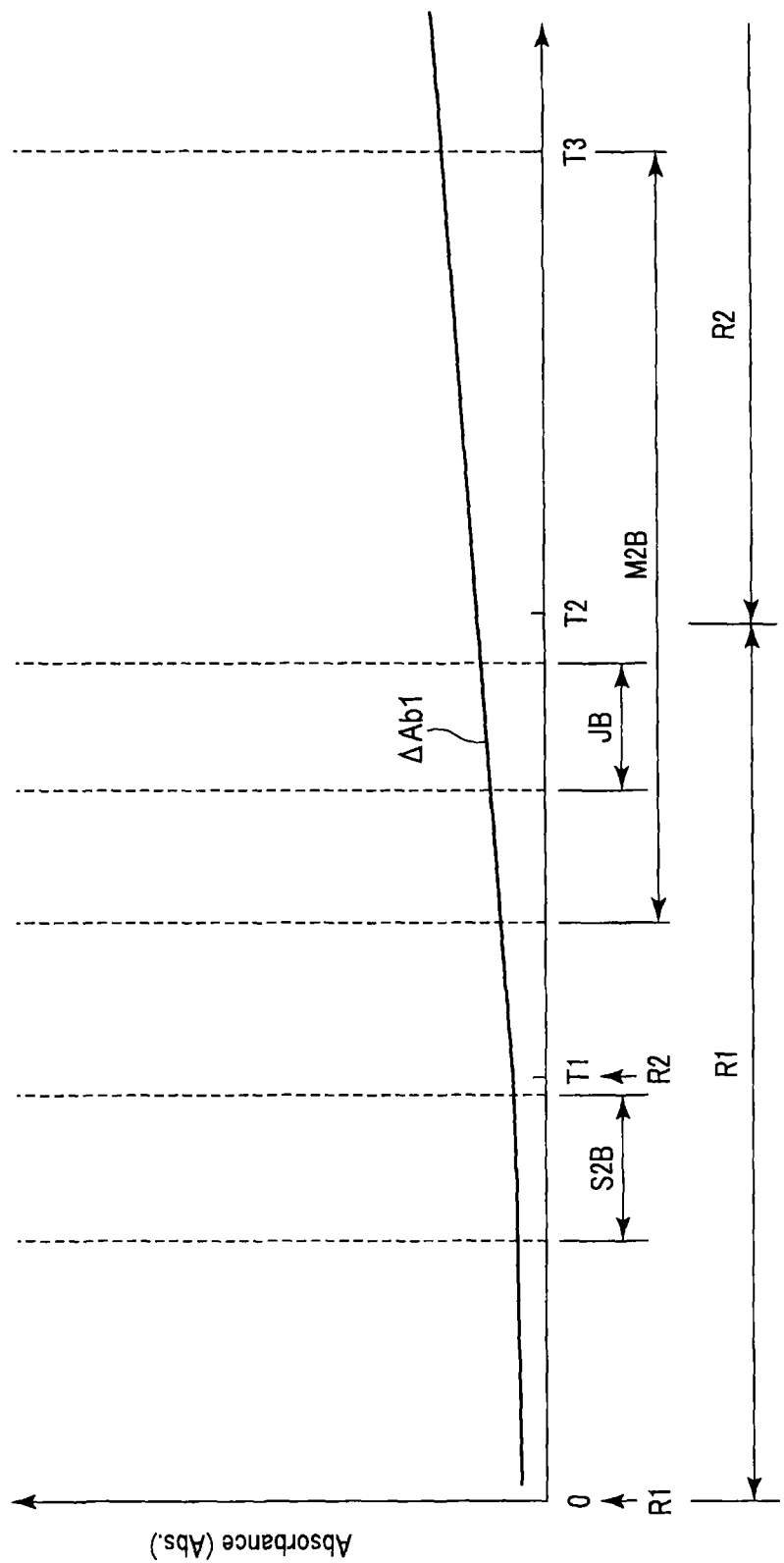
FIG. 9 is a view showing an example when it is determined that the continuation of a reaction is necessary according to the embodiment.

As shown in FIG. 9, the measurement unit 29 generates reaction data by measuring a solution mixture of a test sample for analyzing test item B and first and second reagents at the timing of the determination section Jb. The determination unit 50 performs determination based on the reaction data generated by the measurement unit 29. Since the reaction data has an absorbance change amount ΔAb1 by which the change in absorbance per unit time is smaller than 0.01 Abs/min, the determination unit 50 determines that continuation of the reaction is necessary.

The cleaning nozzle 30 stops cleaning the reaction vessel 17 for analyzing test item B, which stops at the cleaning position W for the first time since cleaning is performed.

As described above, if the determination unit 50 determines that continuation of the reaction is necessary when 2 is set as the number of rounds, cleaning of the reaction vessel 17 for analyzing test item B, which stops at the cleaning position W in the first round, is stopped. This makes it possible to continue the reaction of the solution mixture of the test sample and first and second reagents instead of terminating the reaction in the first round.

In the second round, the sample dispensing probe 19 stops discharging the test sample into the reaction vessel 17 for analyzing test item B, which stops at the sample discharge position Pa for the second time since cleaning is performed. The first reagent dispensing probe 21 stops discharging the reagent into the reaction vessel 17 for analyzing test item B, which stops at the first reagent discharge position Pb for the second time. The first stirrer 23 stops stirring the solution mixture in the reaction vessel 17 for analyzing test item B, which stops at the first stirring position Pc for the second time. The second reagent dispensing probe 25 stops discharging the reagent into the reaction vessel 17 for analyzing test item B, which stops at the second reagent discharge position Pd for the second time. The second stirrer 27 stops stirring the solution mixture in the reaction vessel 17 for analyzing test item B, which stops at the second stirring position Pe for the second time. The cleaning nozzle 30 cleans the interior of the reaction vessel 17 for analyzing test item B, which stops at the cleaning position W for the second time since cleaning is performed. Thus, the use of the reaction vessel 17 for analyzing test item B is finished in the second round.

As shown in FIG. 9, the measurement unit 29 generates test data by measuring the solution mixture for analyzing test item B at the timings of the second main measurement section M2B and second sub measurement section S2B. The arithmetic unit 61 generates analytical data from the test data generated by the measurement unit 29 and the calibration data. The output unit 70 outputs the analytical data of test item B at the timing at which the reaction vessel 17 for analyzing test item B stops at the second reagent discharge position Pd for the second time, as the timing of the time T3 set in the "reaction time" field of the analytical parameter setting screen 74.

Note that as shown in FIG. 10, if reaction data has an absorbance change amount $\Delta Ab2$ by which the change in absorbance per unit time is 0.01 Abs/min or more when measured in the determination section JB, and has an absorbance of 0.15 Abs or more, the determination unit 50 determines that continuation of the reaction is unnecessary. The measurement unit 29 generates test data by measuring the solution mixture for analyzing test item B at the timings of the first main measurement section M1B and first sub measurement section S2B. The arithmetic unit 61 generates analytical data from the test data generated by the measurement unit 29 and the calibration data. The output unit 70 outputs the analytical data of test item B at the timing at which the reaction vessel 17 for test item A stops at the cleaning position W for the first time. The cleaning nozzle 30 cleans the interior of the reaction vessel 17 for analyzing test item B, which stops at the cleaning position W for the first time since cleaning is performed. Thus, the use of the reaction vessel 17 for analyzing test item B is finished in the first round.

As described above, if it is determined that continuation of the reaction is unnecessary, measurement of the solution mixture for analyzing test item B is finished in the first round. Therefore, the analytical data of test item B can be output at a timing earlier than that when continuation of the reaction is necessary. In addition, the reaction vessel 17 for analyzing test item B can be cleaned at a timing earlier than that when continuation of the reaction is necessary.

Also, if it is determined that continuation of the reaction is necessary, the solution mixture for analyzing test item B is measured at the timings of the first and second rounds. This makes it possible to perform measurement over a time period longer than that when continuation of the reaction is found to be unnecessary, so measurement can accurately be performed. Consequently, analytical data can be obtained without any remeasurement, so it is possible to reduce the load on the operator and rapidly perform tests.

In the above-described embodiment, whether to continue the reaction of a solution mixture of a test sample and reagent can be determined based on reaction data generated by measuring the solution mixture. If it is determined that continuation of the reaction of a solution mixture of a test sample and reagent is unnecessary when the set number of rounds is 1, analytical data can be generated at an early timing by measuring the solution mixture at the timing of a first measurement section set in a section until the reaction vessel 17 containing the solution mixture stops at the cleaning position W for the first time since cleaning is performed by the cleaning nozzle 30. If it is determined that continuation of the reaction of a solution mixture of a test sample and reagent is necessary when the set number of rounds is 1, measurement can accurately be performed by measuring the solution mixture at the timing of a second measurement section set in a section until the reaction vessel 17 containing the solution mixture stops at the cleaning position W for the first time since cleaning is performed by the cleaning nozzle 30.

If it is determined that continuation of the reaction of a solution mixture of a test sample and reagent is unnecessary when the set number of rounds is m, it is possible to perform cleaning when the reaction vessel 17 containing the solution mixture stops at the cleaning position W for the first time since cleaning is performed by the cleaning nozzle 30, or to stop cleaning the reaction vessel 17 until the reaction vessel 17 stops at the cleaning position W for the nth time. If it is determined that continuation of the reaction of a solution mixture of a test sample and reagent is necessary, it is possible to stop cleaning the reaction vessel 17 containing the solution mixture until the reaction vessel 17 stops at the cleaning position W for the mth time since cleaning is performed by the cleaning nozzle 30. This can prolong the reaction time of a solution mixture of a test sample and reagent.

Analytical data can be generated at an early timing by measuring a solution mixture of a test sample and reagent at the timing of a first measurement section set in a section until the reaction vessel 17 containing the solution mixture stops at the cleaning position W for the 1st or nth time since cleaning is performed by the cleaning nozzle 30. Also, measurement can accurately be performed by measuring a solution mixture of a test sample and reagent at the timing of a second measurement section set in a section until the reaction vessel 17 containing the solution mixture stops at the cleaning position W for the mth time since cleaning is performed by the cleaning nozzle 30.

From the foregoing, analytical data can be obtained without any remeasurement, and it is possible to reduce the load on the operator and rapidly perform tests.

Second Embodiment

In an automatic analyzing apparatus according to this embodiment, the control based on the determination of reaction continuation described in the first embodiment is applied to an assay including two or more types of reaction modes.

Figure 11:
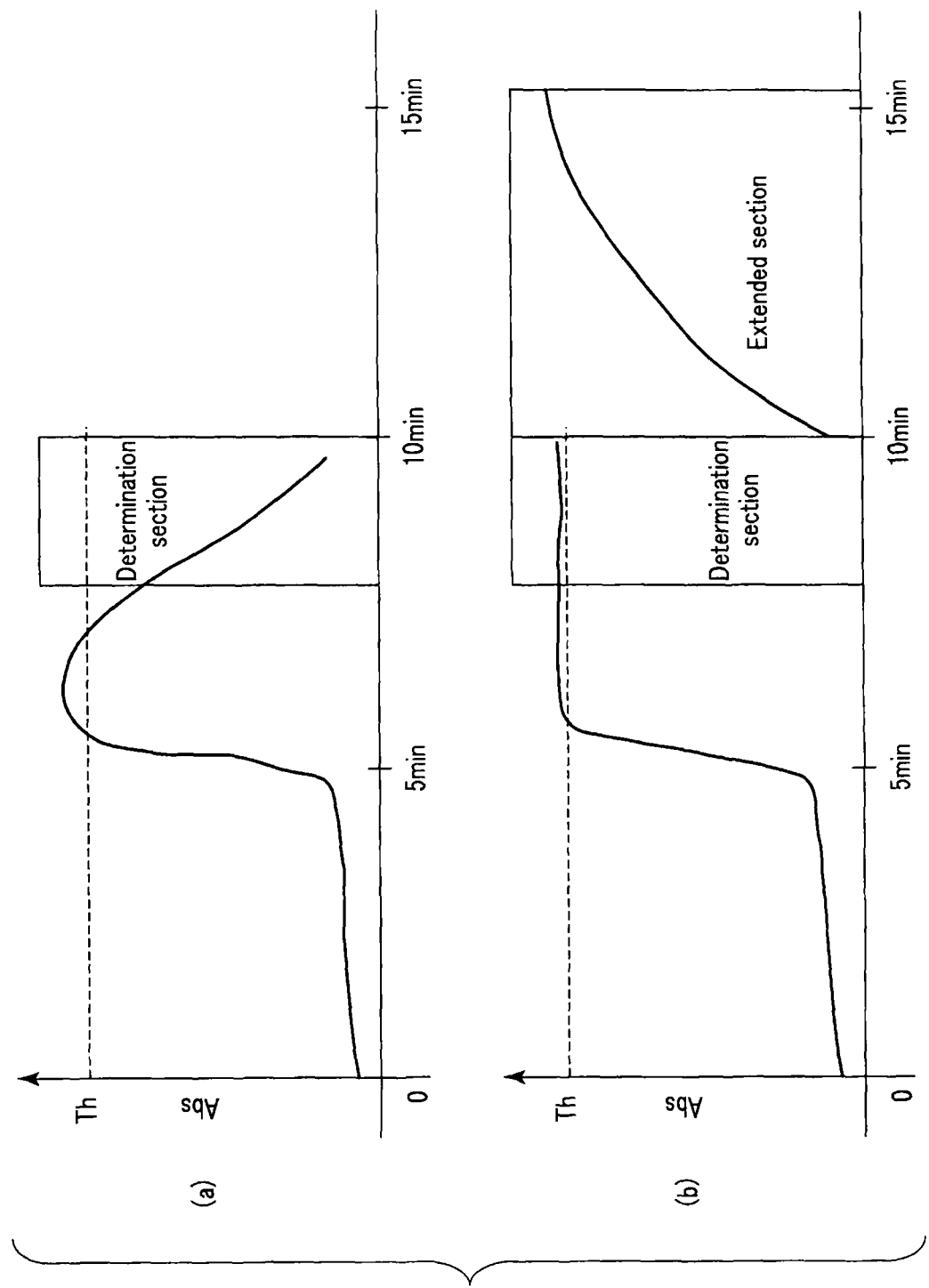
FIG. 11 is a view for explaining a process by which an automatic analyzing apparatus according to the second embodiment determines whether to continue a reaction, and shows a curve indicating a change in absorbance of a solution mixture with time.

In FIG. 11, (a) and (b) are views for explaining processing by which the automatic analyzing apparatus according to the second embodiment determines whether to continue the reaction, and show curves each indicating a change in absorbance of a solution mixture with time. As shown in (a) and (b) of FIG. 11, from 0 to 10 min, reaction A shows a RATE DOWN absorbance curve, but reaction B shows a RATE UP absorbance curve, i.e., different loci are sometimes drawn.

For example, when second reagent R2 is dispensed in a reaction tube in reaction A, the absorbance of a solution mixture in the reaction tube takes a maximum value once as shown in (a) of FIG. 11. Even when this maximum value temporarily exceeds an upper limit Th of a reliable measurement range, if the absorbance is equal to or lower than the upper limit Th in a determination section, a determination unit 50 determines that continuation of the reaction of the solution mixture is unnecessary. A system controller 90 performs the control explained in the first embodiment so as to generate test data by measuring the absorbance of the solution mixture without continuing the reaction period, and generate analytical data by using the test data. On the other hand, if the absorbance does not reach the lower limit of the reliable measurement range in the determination period, the determination unit 50 determines that continuation of the reaction of the solution mixture is necessary. Therefore, the system controller 90 performs the control explained in the first embodiment in order to continue the reaction period.

Also, as shown in (b) of FIG. 11, the absorbance of a solution mixture in reaction A sometimes keeps exceeding the upper limit Th of the reliable measurement range even in the determination period. In a case like this, the determination unit 50 determines that measurement in reaction B is necessary because the absorbance of the solution mixture exceeds the upper limit Th in the determination section. The system controller 90 performs the operation explained in the first embodiment in order to add a reagent of reaction B and continue the reaction period.

In this embodiment, even when performing measurement in two or more types of reaction modes in order to process a new measurement item, the necessity of extension of the reaction time, the necessity of dilution (reagent addition) of the solution mixture, and the reagent dispensing timing are determined in real time, and, in accordance with the determination results, the processes of, e.g., extending the reaction time and diluting the solution mixture are executed. Instead of simultaneous control of items, therefore, it is possible to, e.g., extend the reaction time in each individual measurement, and expand the dynamic range in each individual measurement by performing dilution as needed. As a consequence, accurate biopsy can be performed with a small workload without extending the analytical time more than necessary.

(Modifications)

In each of the above embodiments, an example using two reagents, i.e., first and second reagents or an example using three reagents, i.e., first, second, and third reagents is disclosed. However, each embodiment is not limited to this example, and the number of types of reagents may also be four or more.

Also, in each of the above embodiments, an example using a change in absorbance of a solution mixture with time is explained. However, each embodiment is not limited to this example, and it is also possible to use a change in absorbance change rate of a solution mixture with time.

The above described "processing circuitry" means, for example, a central processing unit (CPU), a graphics processing unit (GPU), an application specific integrated circuit (ASIC), a programmable logical device (e.g., a simple programmable logic device (SPLD), a complex programmable logic device (CPLD), and a field programmable gate array (FPGA)), or the like.

Although several embodiments of the present invention have been explained, these embodiments are presented as examples, and are not intended to limit the scope of the invention. These novel embodiments can be practiced in a variety of other forms, and various omissions, replacements, and changes can be made without departing from the spirit and scope of the invention. These embodiments and their modifications are incorporated in the spirit and scope of the invention, and are also incorporated within the range of inventions and their equivalents described in the scope of claims.

The invention claimed is:

1. An automatic analyzing apparatus comprising:
at least one reaction vessel configured to contain a solution mixture including reagent and sample causing a reaction;
a reaction table containing the at least one reaction vessel;
a mechanical unit to rotate the reaction table and stop the at least one reaction vessel at positions including a sample dispensing position, a reagent dispensing position, and a cleaning position;
a sample dispensing probe configured to aspirate a sample from a sample vessel and dispense the sample into the at least one reaction vessel in the reaction table at the sample dispensing position;
a reagent dispensing probe configured to aspirate a reagent from a reagent vessel and dispense the reagent into the at least one reaction vessel in the reaction table at the reagent dispensing position, wherein dispensing the reagent starts the reaction resulting in a solution mixture;
a cleaning probe configured to aspirate the solution mixture from the at least one reaction vessel in the reaction table at the cleaning position, wherein aspirating of the solution mixture stops the reaction in the solution mixture;
an analyzer mechanism configured to generate absorbance data by measuring the reaction of the solution mixture inside the at least one reaction vessel inside the reaction table at a detection position;
determination processing circuitry configured to:
determine that continuation of the reaction of the solution mixture is unnecessary if the absorbance exceeds a first predetermined value and/or an absorbance change of the solution mixture undergoing the reaction exceeds a second predetermined value, and
determine that the continuation of the reaction of the solution mixture is necessary if the absorbance of the solution mixture undergoing the reaction is equal to or below the first predetermined value and/or the absorbance change of the solution mixture undergoing the reaction is equal to or below the second predetermined value; and
control processing circuitry configured to:
control a mechanical unit to rotate the reaction vessel containing the solution mixture and stop the reaction vessel at positions including the cleaning position;

control the analyzer mechanism to, if during a first round the determination processing circuitry determines that the continuation of the reaction of the solution mixture is unnecessary, generate the analytical data by measuring the solution mixture in the first round and after the determination by the determination processing circuitry and to generate the analytical data by measuring the solution mixture in a second round after the first round if throughout all of the first round the determination processing circuitry determines that the continuation of the reaction of the solution mixture is necessary, wherein the first round is a period of time for the reaction vessel to be initially cleaned at a first cleaning position, rotated from the first cleaning position, injected with the solution mixture, determine absorbance of the solution mixture by the determination processing circuitry, and be set in the cleaning position for a second time, and the second round is a period of time for the reaction vessel at completion of the first round to be rotated from the cleaning position again without being cleaned, determine absorbance of the solution mixture by the determination processing circuitry, and be set in the cleaning position for a third time, wherein the determining the absorbance of the solution mixture is executed between each cleaning position; and control a cleaning nozzle to, if during the first round the determination processing circuitry determines that the continuation of the reaction of the solution mixture is unnecessary, after determining the absorbance of the solution mixture executed between each cleaning position, clean the reaction vessel containing the solution mixture in the first round and after the determination by the determination processing circuitry, and not to clean the reaction vessel containing the solution mixture in the first round if throughout all of the first round the determination processing circuitry determines that continuation of the reaction of the solution mixture is necessary.

2. The automatic analyzing apparatus of claim 1, wherein if the determination processing circuitry determines that continuation of the reaction of the solution mixture is necessary, the control processing circuitry controls the data processing circuitry to generate the analytical data in the second round set in a period including the first round and a round after the first round.

3. The automatic analyzing apparatus of claim 2, wherein the control processing circuitry executes a process of cleaning a reaction vessel containing the solution mixture after the second period.

4. The automatic analyzing apparatus of claim 1, wherein the determination processing circuitry further determines whether to dilute the solution mixture, and
if the determination processing circuitry determines based on the generated absorbance data that dilution of the solution mixture is necessary, the control processing circuitry controls the reagent dispensing probe to dispense the reagent into the solution mixture.

5. The automatic analyzing apparatus of claim 1, wherein if the determination processing circuitry determines that continuation of the reaction of the solution mixture is necessary, the control processing circuitry controls the reagent dispensing probe to execute a process of dispensing a preset new reagent into the solution mixture in a next round, the present reagent having a component capable of diluting the solution mixture of a test sample, first reagent, and second reagent.

6. The automatic analyzing apparatus of claim 1, wherein
if the determination processing circuitry determines that continuation of the reaction of the solution mixture is unnecessary, the control processing circuitry controls a cleaning nozzle to execute a process of cleaning a reaction vessel containing the solution mixture when the reaction vessel stops at the same cleaning position for the first time or the nth time (n is an integer of not less than 2) since the reaction vessel is cleaned, and
if the determination processing circuitry determines that continuation of the reaction of the solution mixture is necessary, the control processing circuitry controls the cleaning nozzle to execute a process of cleaning a reaction vessel containing the solution mixture when the reaction vessel stops at the same cleaning position for the mth time (m is an integer of not less than n) since the reaction vessel is cleaned.

7. The automatic analyzing apparatus of claim 1, wherein the determination round and the first round are included in a period until a reaction vessel containing the solution mixture stops at the same cleaning position for the first time or the nth time (n is an integer of not less than 2) since the reaction vessel is cleaned, and
the analytical data is generated in a period set until the reaction vessel stops at the same cleaning position for the mth time (m is an integer of not less than n) since the reaction vessel is cleaned.

8. The automatic analyzing apparatus of claim 1, wherein if the determination processing circuitry determines that continuation of the reaction of the solution mixture is unnecessary, the control processing circuitry performs control such that the solution mixture is measured and the analytical data is generated in the first round.

* * * * *